US008639999B2

(12) United States Patent
Miki et al.

(10) Patent No.: US 8,639,999 B2
(45) Date of Patent: Jan. 28, 2014

(54) BASE STATION APPARATUS, MOBILE TERMINAL APPARATUS, MOBILE COMMUNICATION SYSTEM AND INFORMATION RETRANSMISSION METHOD

(75) Inventors: Nobuhiko Miki, Kanagawa (JP); Satoshi Nagata, Kanagawa (JP); Yoshihisa Kishiyama, Kanagawa (JP); Mamoru Sawahashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 345 days.

(21) Appl. No.: 13/126,706

(22) PCT Filed: Oct. 29, 2009

(86) PCT No.: PCT/JP2009/068586
§ 371 (c)(1),
(2), (4) Date: Jun. 28, 2011

(87) PCT Pub. No.: WO2010/053041
PCT Pub. Date: May 14, 2010

(65) Prior Publication Data
US 2011/0274142 A1    Nov. 10, 2011

(30) Foreign Application Priority Data
Nov. 4, 2008 (JP) .................................. 2008-283753

(51) Int. Cl.
*H03M 13/00* (2006.01)
(52) U.S. Cl.
USPC ........................................ 714/751; 714/704
(58) Field of Classification Search
USPC .............. 455/67.11, 3.05; 370/310, 349, 328; 714/748, 751, 704
See application file for complete search history.

(56) References Cited

U.S. PATENT DOCUMENTS

| 7,130,588 B2 * | 10/2006 | Niwano .................... 455/67.11 |
| 8,009,596 B2 * | 8/2011 | Tomioka ..................... 370/310 |
| 8,347,161 B2 * | 1/2013 | Park et al. ................... 714/748 |
| 2001/0056560 A1 | 12/2001 | Khan et al. |

(Continued)

FOREIGN PATENT DOCUMENTS

| JP | 2002-527939 A | 8/2002 |
| JP | 2006-173834 A | 6/2006 |

(Continued)

OTHER PUBLICATIONS

International Search Report w/translation from PCT/JP2009/068586 dated Jan. 12, 2010 (4 pages).

(Continued)

Primary Examiner — David Ton
(74) Attorney, Agent, or Firm — Osha Liang LLP

(57) ABSTRACT

To suppress deterioration of retransmission efficiency and retransmit a transmission signal efficiently even when the system bandwidth is extended, provided are a base station apparatus (20) which divides, in a retransmission block dividing section (21), a transmission signal into retransmission blocks according to a retransmission block table in which the number of the retransmission blocks each of which is a retransmission unit of a transmission signal is increased corresponding to the number of transmission antennas and registered, and retransmits in downlink transmission signals associated with the divided retransmission blocks, and a mobile terminal apparatus (10) which receives the transmission signals associated with the retransmission blocks from the base station apparatus (20), and combines the retransmission blocks to restore the transmission signal prior to division.

19 Claims, 22 Drawing Sheets

(56) References Cited

U.S. PATENT DOCUMENTS

| | | | |
|---|---|---|---|
| 2002/0046380 A1* | 4/2002 | Tomaru et al. | 714/751 |
| 2002/0181437 A1* | 12/2002 | Ohkubo et al. | 370/349 |
| 2004/0157547 A1* | 8/2004 | Kim | 455/3.05 |
| 2004/0228320 A1 | 11/2004 | Laroia et al. | |
| 2006/0128309 A1 | 6/2006 | Dateki et al. | |
| 2007/0115914 A1* | 5/2007 | Ohkubo et al. | 370/349 |
| 2007/0196072 A1 | 8/2007 | Zhou et al. | |
| 2008/0043713 A1* | 2/2008 | Komatsu | 370/349 |
| 2009/0185577 A1 | 7/2009 | Kishiyama et al. | |
| 2010/0195571 A1* | 8/2010 | Kuri et al. | 370/328 |

FOREIGN PATENT DOCUMENTS

| | | |
|---|---|---|
| JP | 2006-217239 A | 8/2006 |
| JP | 2007-221178 A | 8/2007 |
| JP | 2007-525043 A | 8/2007 |
| JP | 2007-228029 A | 9/2007 |
| WO | 2008/041309 A1 | 4/2008 |

OTHER PUBLICATIONS

3GPP TSG RAN WG1 Meeting #46, R1-062106; "Investigation on Optimum Number of Codewords for MIMO Multiplexing in E-UTRA Downlink"; NTT Docomo et al.; Tallinn, Estonia; Aug. 28-Sep. 1, 2006 (7 pages).

3GPP TSG RAN WG1 53bis, R1-082707; "Uplink SU-MIMO for E-UTRA"; Texas Instruments; Warsaw, Poland; Jun. 30-Jul. 4, 2008 (6 pages).

3GPP TS 36.211 V8.4.0.; "3rd Generation Partnership Project; Technical Specification Group Radio Access Network; Evolved Universal Terrestrial Radio Access (E-UTRA); Physical Channels and Modulation (Release 8)"; Sep. 2008 (78 pages).

3GPP TS 36.212 V8.4.0; "3rd Generation Partnership Project; Technical Specification Group Radio Access Network; Evolved Universal Terrestrial Radio Access (E-UTRA); Multiplexing and channel coding (Release 8)"; Sep. 2008 (56 pages).

3GPP TS 36.213 V8.4.0; "3rd Generation Partnership Project; Technical Specification Group Radio Access Network; Evolved Universal Terrestrial Radio Access (E-UTRA); Physical layer procedures (Release 8)"; Sep. 2008 (60 pages).

RAN WG1 Meeting #53bis, R1-082609; "Uplink Multiple access for LTE-Advanced"; Nokia Siemens Networks; Warsaw, Poland; Jun. 30-Jul. 4, 2008 (11 pages).

Office Action for Japanese Application No. 2008-283753, mailed Dec. 11, 2012, with English translations thereof (6 pages).

3GPP TSG RAN WG1 #49bis, R1-072868, "Mapping of Encoded Code Blocks to Layers in 4 TX Antennas," LG Electronics, Orlando, USA, Jun. 25-29, 2007 (4 pages).

Office Action for Japanese Application No. 2008-283753, mailed Jul. 16, 2013, with English translation thereof (5 pages).

3GPP TSG RAN WG1 Meeting #46bis, R1-062597; "Number of HAEQ Channels;" Motorola; Seoul, Korea; Oct. 9-13, 2006 (7 pages).

3GPP TSG RAN WG1 Meeting #45, R1-061538; "ILTE Target Fulfilment Complexity—Text Proposal;" Nokia; Shanghai, China; May 8-12, 2006 (4 pages).

* cited by examiner

| | | SYSTEM BANDWIDTH | | | | | | | |
|---|---|---|---|---|---|---|---|---|---|
| | | 20MHz | | 40MHz | | 80MHz | | 100MHz | |
| | | NUMBER OF TBs | BS | NUMBER OF TBs | BS | NUMBER OF TBs | BS | NUMBER OF TBs | BS |
| LAYER | 1 | 1 | 75000 | 1 | 150000 | 1 | 300000 | 1 | 375000 |
| | 2 | 2 | 75000 | 2 | 150000 | 2 | 300000 | 2 | 375000 |
| | 4 | 4 | 75000 | 4 | 150000 | 4 | 300000 | 4 | 375000 |
| | 8 | 8 | 75000 | 8 | 150000 | 8 | 300000 | 8 | 375000 |

FIG. 5

| RETRANSMISSION REQUEST SIGNAL | MEANING | BASE STATION PROCESSING |
|---|---|---|
| 00 | ACK | NEW PACKET |
| 01 | NACK (THE NUMBER OF ERRONEOUS CODING BLOCKS IS 1/3 OR LESS) | ADD THE SHORTEST REDUNDANT BITS TO TRANSMIT |
| 10 | NACK (THE NUMBER OF ERRONEOUS CODING BLOCKS IS MORE THAN 1/3 UP TO 2/3 OR LESS) | ADD SHORT REDUNDANT BITS TO TRANSMIT |
| 11 | NACK (THE NUMBER OF ERRONEOUS CODING BLOCKS IS MORE THAN 2/3) | ADD LONG REDUNDANT BITS TO TRANSMIT |

| LAYER | 20MHz | | 40MHz | | SYSTEM BANDWIDTH 80MHz | | 100MHz | |
|---|---|---|---|---|---|---|---|---|
| | NUMBER OF TBs | BS | NUMBER OF TBs | BS | NUMBER OF TBs | BS | NUMBER OF TBs | BS |
| 1 | 1 | 75000 | 1 | 150000 | 1 | 300000 | 1 | 375000 |
| 2 | 2 | 75000 | 2 | 150000 | 2 | 300000 | 2 | 375000 |
| 4 | 2 | 150000 | 2 | 300000 | 2 | 600000 | 2 | 750000 |
| 8 | 2 | 300000 | 2 | 600000 | 2 | 1200000 | 2 | 1500000 |

(b)

| LAYER | 20MHz | | 40MHz | | SYSTEM BANDWIDTH 80MHz | | 100MHz | |
|---|---|---|---|---|---|---|---|---|
| | NUMBER OF TBs | BS | NUMBER OF TBs | BS | NUMBER OF TBs | BS | NUMBER OF TBs | BS |
| 1 | 1 | 75000 | 1 | 150000 | 1 | 300000 | 1 | 375000 |
| 2 | 2 | 75000 | 2 | 150000 | 2 | 300000 | 2 | 375000 |
| 4 | 4 | 75000 | 4 | 150000 | 4 | 300000 | 4 | 375000 |
| 8 | 4 | 150000 | 4 | 300000 | 4 | 600000 | 4 | 750000 |

FIG. 13

(a)
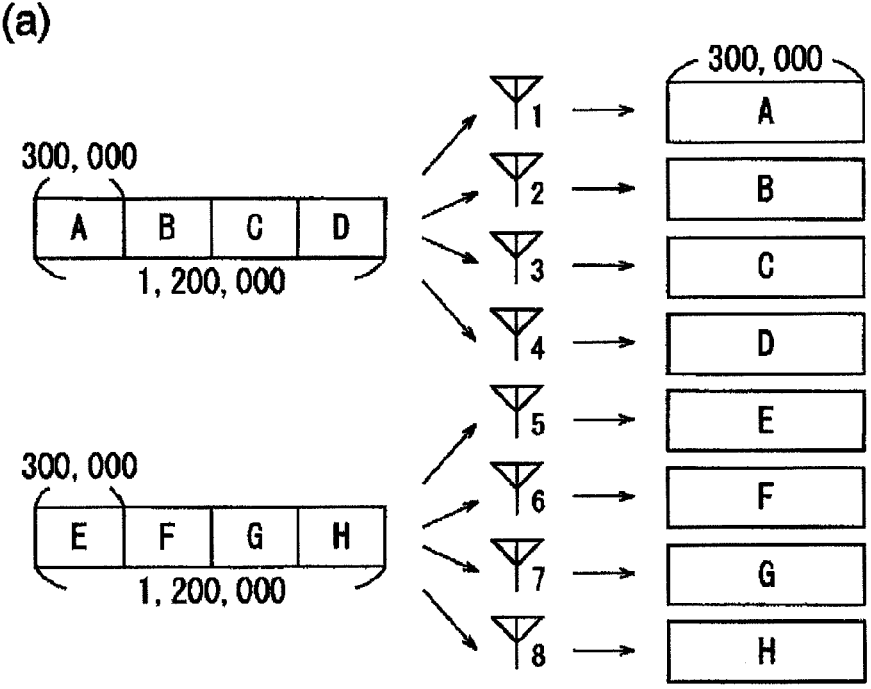
(b)
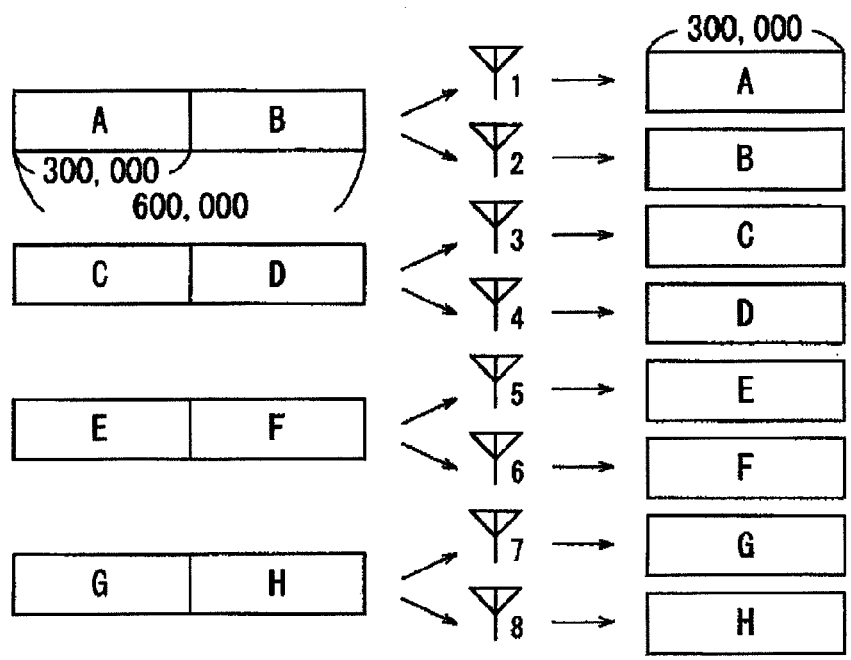
FIG. 14

| | SYSTEM BANDWIDTH | | | | | | | |
|---|---|---|---|---|---|---|---|---|
| | 20MHz | | 40MHz | | 80MHz | | 100MHz | |
| LAYER | NUMBER OF TBs | BS | NUMBER OF TBs | BS | NUMBER OF TBs | BS | NUMBER OF TBs | BS |
| 1 | 1 | 75000 | 2 | 75000 | 4 | 75000 | 5 | 75000 |
| 2 | 2 | 75000 | 4 | 75000 | 8 | 75000 | 10 | 75000 |
| 4 | 2 | 150000 | 4 | 150000 | 8 | 150000 | 10 | 150000 |
| 8 | 2 | 300000 | 4 | 300000 | 8 | 300000 | 10 | 300000 |

FIG. 15

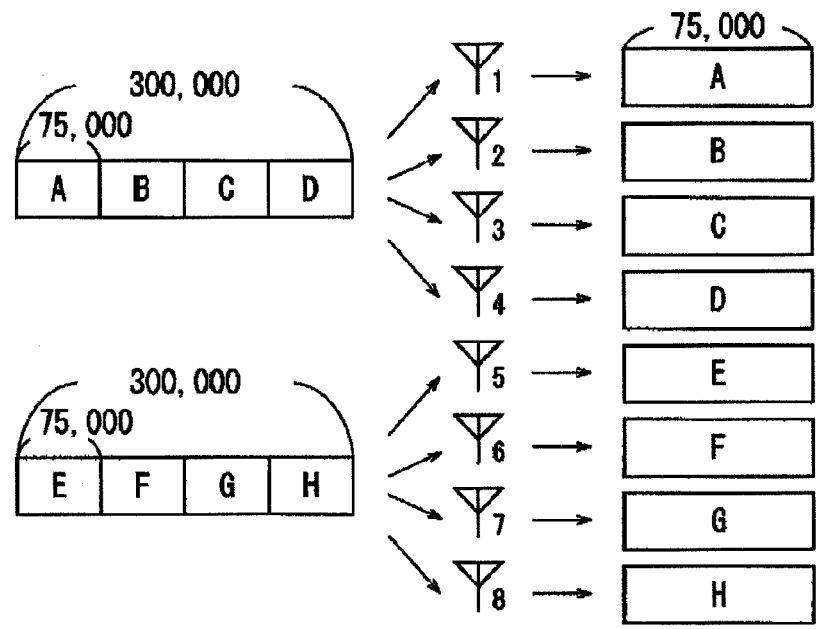
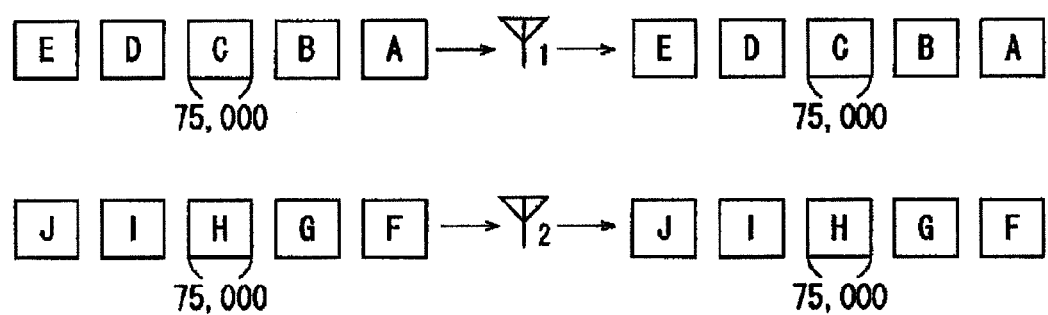
FIG. 16

|  | | SYSTEM BANDWIDTH | | | | | | | |
|---|---|---|---|---|---|---|---|---|---|
|  | | 20MHz | | 40MHz | | 80MHz | | 100MHz | |
|  | | NUMBER OF TBs | BS | NUMBER OF TBs | BS | NUMBER OF TBs | BS | NUMBER OF TBs | BS |
| LAYER | 1 | 1 | 75000 | 2 | 75000 | 4 | 75000 | 5 | 75000 |
|  | 2 | 2 | 75000 | 4 | 75000 | 8 | 75000 | 10 | 75000 |
|  | 4 | 2 | 150000 | 4 | 150000 | 8 | 150000 | 10 | 150000 |
|  | 8 | 4 | 150000 | 8 | 150000 | 16 | 150000 | 20 | 150000 |

FIG. 17

| | | SYSTEM BANDWIDTH | | | | | | | |
|---|---|---|---|---|---|---|---|---|---|
| | | 20MHz | | 40MHz | | 80MHz | | 100MHz | |
| | | NUMBER OF TBs | BS | NUMBER OF TBs | BS | NUMBER OF TBs | BS | NUMBER OF TBs | BS |
| LAYER | 1 | 1 | 75000 | 2 | 75000 | 4 | 75000 | 5 | 75000 |
| | 2 | 1 | 150000 | 2 | 150000 | 4 | 150000 | 5 | 150000 |
| | 4 | 1 | 300000 | 2 | 300000 | 4 | 300000 | 5 | 300000 |
| | 8 | 1 | 600000 | 2 | 600000 | 4 | 600000 | 5 | 600000 |

FIG. 19

(a)
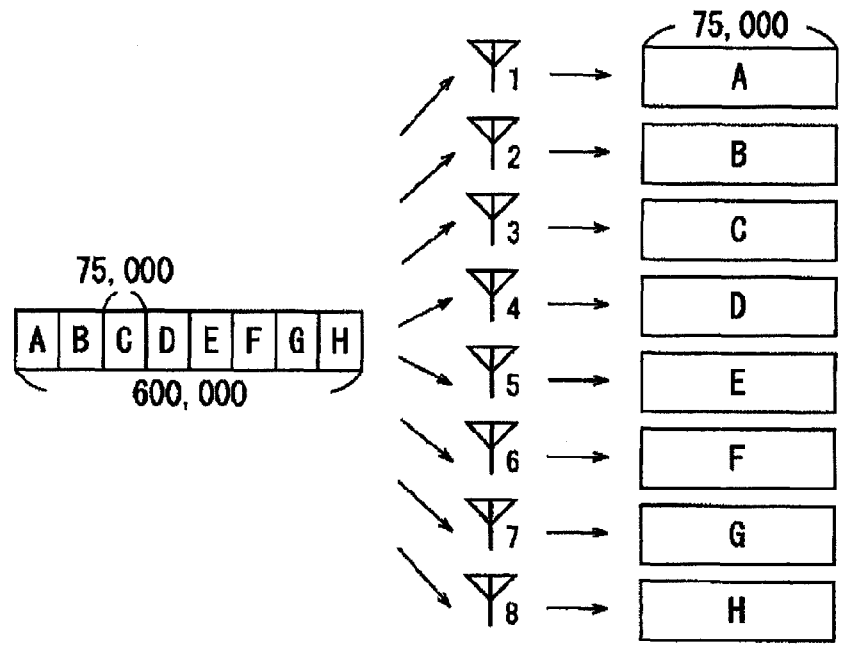
(b)
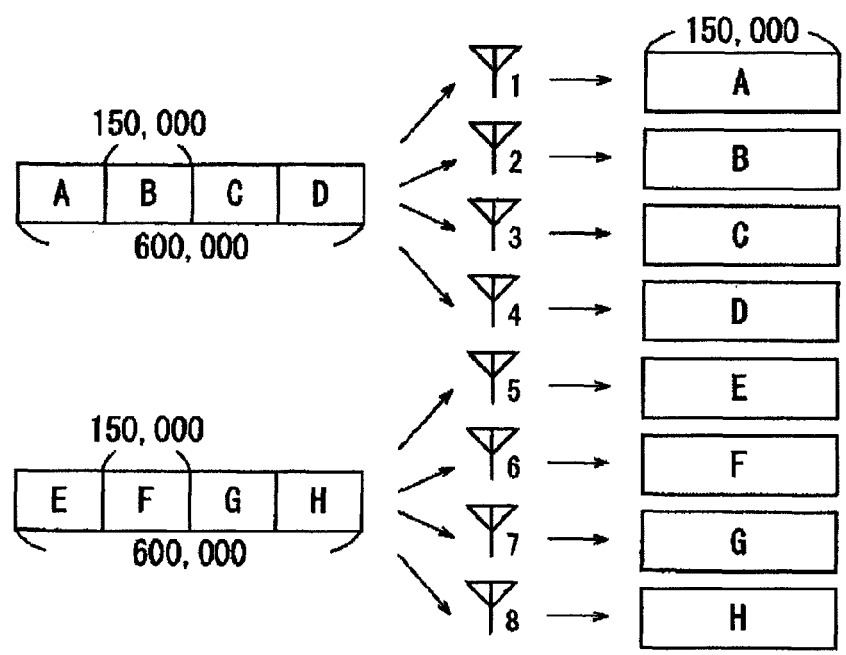
FIG. 20

| | | SYSTEM BANDWIDTH | | | | | | | |
|---|---|---|---|---|---|---|---|---|---|
| | | 1.4MHz | | 5MHz | | 10MHz | | 20MHz | |
| | | NUMBER OF TBs | BS | NUMBER OF TBs | BS | NUMBER OF TBs | BS | NUMBER OF TBs | BS |
| LAYER | 1 | 1 | 75000 | 1 | 75000 | 1 | 75000 | 1 | 75000 |
| | 2 | 2 | 75000 | 2 | 75000 | 2 | 75000 | 2 | 75000 |
| | 4 | 2 | 150000 | 2 | 150000 | 2 | 150000 | 2 | 150000 |

FIG. 21

IN THE CASE OF A SINGLE TRANSMISSION ANTENNA
IN THE CASE OF TWO TRANSMISSION ANTENNAS
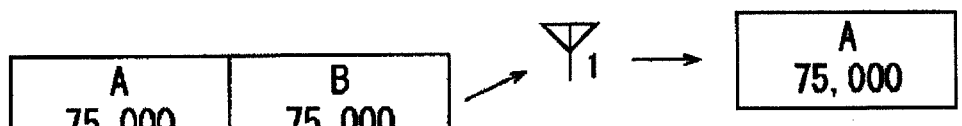
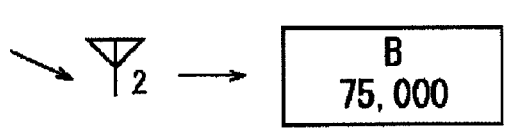
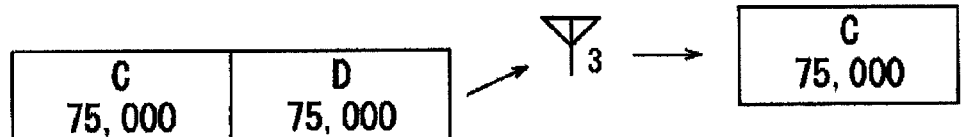
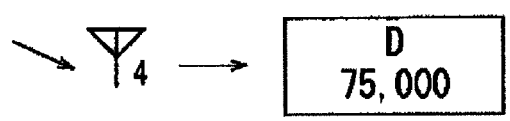
IN THE CASE OF FOUR TRANSMISSION ANTENNAS
FIG. 22

BASE STATION APPARATUS, MOBILE TERMINAL APPARATUS, MOBILE COMMUNICATION SYSTEM AND INFORMATION RETRANSMISSION METHOD

TECHNICAL FIELD

The present invention relates to a base station apparatus, mobile terminal apparatus, mobile communication system and information retransmission method, and more particularly, to abase station apparatus, mobile terminal apparatus, mobile communication system and information retransmission method using next-generation mobile communication techniques.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, the widest system band of 20 MHz in the LTE specification is scheduled to be extended to about 100 MHz.

Further, the LTE scheme system adopts multi-antenna radio transmission techniques such as the MIMO (Multiple Input Multiple Output) multiplexing method, and actualizes fast signal transmission by transmitting different transmission signals parallel from a plurality of transmitters using the same radio resources (frequency band, time slot) to spatially multiplex. In the LTE scheme system, it is possible to transmit different transmission signals parallel from four transmission antennas at the maximum to spatially multiplex. In LTE-A, the maximum number (four) of transmission antennas in the LTE specification is scheduled to be increased to eight.

In addition, in the LTE scheme system, when a transmission error occurs in an information bit, the receiver makes a retransmission request, and in response to the retransmission request, the transmitter performs retransmission control. In this case, the number of blocks (hereinafter, referred to as "retransmission blocks") each of which is a retransmission unit in performing retransmission control is determined corresponding to the number of transmission antennas irrespective of the system bandwidth (for example, Non-patent Documents 1 to 3). Described herein are the relationships in the LTE scheme between the system bandwidth and the number of transmission antennas, and between the number of retransmission blocks (the number of TBs) and the retransmission block size (BS). FIG. 21 is a table showing the relationships in the LTE scheme system between the system bandwidth and the number of transmission antennas, and between the number of retransmission blocks and the retransmission block size. In addition, FIG. 21 shows 1.4 MHz, 5 MHz, 10 MHz and 20 MHz as the system bandwidth. Further, the "layer" as shown in FIG. 21 corresponds to the number of transmission antennas.

As shown in FIG. 21, in the LTE scheme system, irrespective of the system bandwidth, a single retransmission block is set in the case of a single transmission antenna. Similarly, the number of retransmission blocks is set at two in the case that the number of transmission antennas is two, and also the number of retransmission blocks is set at two in the case that the number of transmission antennas is four. In other words, when the number of transmission antennas is two or more, the number of retransmission blocks is equally set at two. In addition, the retransmission block size of the LTE specification is set at 150,000 bits at the maximum. FIG. 21 shows the case that the retransmission block size is set at 150,000 bits when the number of transmission antennas is four, and that the retransmission block size is set at 75,000 bits when the number of transmission antennas is two or less.

Herein, FIG. 22 shows a conceptual diagram of the retransmission block transmitted from the transmission antenna in the LTE scheme system. As shown in FIG. 22, in the case of a single transmission antenna, the retransmission block size is set at 75,000 bits, and a transmission signal A of 75,000 bits is transmitted from a transmission antenna 1. Further, in the case of two transmission antennas, the retransmission block size is set at 75,000 bits, and transmission signal A and transmission signal B each of 75,000 bits are transmitted from the transmission antenna 1 and transmission antenna 2, respectively. Furthermore, in the case of four transmission antennas, the retransmission block size is set at 150,000 bits, transmission signal A and transmission signal B each of 75,000 bits are transmitted from the transmission antenna 1 and transmission antenna 2, and transmission signal C and transmission signal D each of 75,000 bits are transmitted from transmission antenna 3 and transmission antenna 4, respectively.

CITATION LIST

Non-Patent Literature

[Non-patent Literature 1] 3GPP, TS 36.211 (V.8.4.0), "Evolved Universal Terrestrial Radio Access (E-UTRA); Physical Channels and Modulation (Release 8)", September 2008

[Non-patent Literature 2] 3GPP, TS 36.212 (V.8.4.0), "Evolved Universal Terrestrial Radio Access (E-UTRA); Multiplexing and channel coding (Release 8)", September 2008

[Non-patent Literature 3] 3GPP, TS 36.213 (V.8.4.0), "Evolved Universal Terrestrial Radio Access (E-UTRA); Physical layer procedures (Release 8)", September 2008

SUMMARY OF THE INVENTION

Technical Problem

As described above, in LTE-A, it is scheduled that the maximum system bandwidth is extended to about 100 MHz, and that the maximum number of transmission antennas is increased to eight. In applying the number of retransmission blocks in the LTE specification as described above, even when the number of transmission antennas is eight and the system bandwidth is 100 MHz, the number of retransmission blocks is set at two, and each of the retransmission block sizes increases. In this case, even when a single error occurs in information bits included in the retransmission block, it is necessary to transmit the retransmission block again, and retransmission efficiency is considered deteriorating.

The invention was made in view of such circumstances, and it is an object of the invention to provide a base station apparatus, mobile terminal apparatus, mobile communication system and information retransmission method for suppressing deterioration of retransmission efficiency and enabling a transmission signal to be retransmitted efficiently even when the system bandwidth is extended.

Solution to the Problem

A base station apparatus of the invention is characterized by having retransmission block dividing means for dividing a transmission signal into retransmission blocks according to a retransmission block table in which the number of the retransmission blocks each of which is a retransmission unit of a transmission signal is increased corresponding to the number of transmission antennas and registered, and retransmission means for retransmitting in downlink transmission signals associated with the retransmission blocks divided by the retransmission block dividing means.

According to this configuration, a transmission signal is divided into retransmission blocks according to a retransmission block table in which the number of retransmission blocks each of which is a retransmission unit of a transmission signal is increased corresponding to the number of transmission antennas and registered, transmission signals associated with the retransmission blocks are retransmitted in downlink, it is thereby possible to increase the number of retransmission blocks in retransmitting a transmission signal corresponding to the number of transmission antennas, it is thus possible to prevent the occurrence of circumstances that retransmission of a retransmission block having a large retransmission block size is repeated due to a transmission error, and therefore, also in the case that the system bandwidth is extended, it is possible to suppress deterioration of retransmission efficiency and to retransmit a transmission signal efficiently.

A mobile terminal apparatus of the invention is characterized by having reception means for receiving transmission signals divided into retransmission blocks according to a retransmission block table in which the number of the retransmission blocks each of which is a retransmission unit of a transmission signal is increased corresponding to the number of transmission antennas and registered, and retransmission block combining means for combining the retransmission blocks to restore a transmission signal prior to division.

According to this configuration, the mobile terminal apparatus combines transmission signals divided into retransmission blocks according to a retransmission block table in which the number of retransmission blocks each of which is a retransmission unit of a transmission signal is increased corresponding to the number of transmission antennas and registered, and restores a transmission signal prior to division, it is thus possible to prevent the occurrence of circumstances that retransmission of a retransmission block having a large retransmission block size is repeated due to a transmission error, and therefore, also in the case that the system bandwidth is extended, it is possible to suppress deterioration of retransmission efficiency and to retransmit a transmission signal efficiently.

Technical Advantage of the Invention

According to the invention, a transmission signal is divided into retransmission blocks according to a retransmission block table in which the number of retransmission blocks each of which is a retransmission unit of a transmission signal is registered and increased corresponding to the number of transmission antennas, transmission signals associated with the retransmission blocks are retransmitted in downlink, it is thereby possible to increase the number of retransmission blocks in retransmitting a transmission signal corresponding to the number of transmission antennas, it is thus possible to prevent the occurrence of circumstances that retransmission of a retransmission block having a large retransmission block size is repeated due to a transmission error, and therefore, also in the case that the system bandwidth is extended, it is possible to suppress deterioration of retransmission efficiency and to retransmit a transmission signal efficiently.

BRIEF DESCRIPTION OF DRAWINGS

FIG. 5 is a diagram showing an example of a retransmission block table that the base station apparatus refers to in performing retransmission control according to the above-mentioned Embodiment;

FIG. 11 is a diagram to explain an example of retransmission request signals generated in a control signal generating section of the mobile terminal apparatus according to the above-mentioned Embodiment;

FIG. 13 is a diagram showing a modification of the retransmission block table referred to in the base station apparatus according to the above-mentioned Embodiment;

FIG. 14 is a conceptual diagram of retransmission blocks transmitted from the base station apparatus according to the retransmission block table as shown in FIG. 13;

FIG. 15 is a diagram showing another modification of the retransmission block table referred to in the base station apparatus according to the above-mentioned Embodiment;

FIG. 16 is a conceptual diagram of retransmission blocks transmitted from the base station apparatus according to the retransmission block table as shown in FIG. 15;

FIG. 17 is a diagram showing still another modification of the retransmission block table referred to in the base station apparatus according to the above-mentioned Embodiment;

FIG. 19 is a diagram showing still another modification of the retransmission block table referred to in the base station apparatus according to the above-mentioned Embodiment;

FIG. 20 is a conceptual diagram of retransmission blocks transmitted from the base station apparatus according to the retransmission block table as shown in FIG. 19;

FIG. 21 is a table showing the relationships in an LTE scheme system between the system bandwidth and the number of transmission antennas, and between the number of retransmission blocks and the retransmission block size; and FIG. 22 is a conceptual diagram of retransmission blocks transmitted from the base station apparatus according to the retransmission block table as shown in FIG. 21.

DESCRIPTION OF EMBODIMENTS

An Embodiment of the invention will specifically be described below with reference to accompanying drawings. In addition, the following description is given using an LTE-A (LTE Advanced) scheme system as an example of a successor system to LTE, but the invention is not limited thereto.

Figure 1:
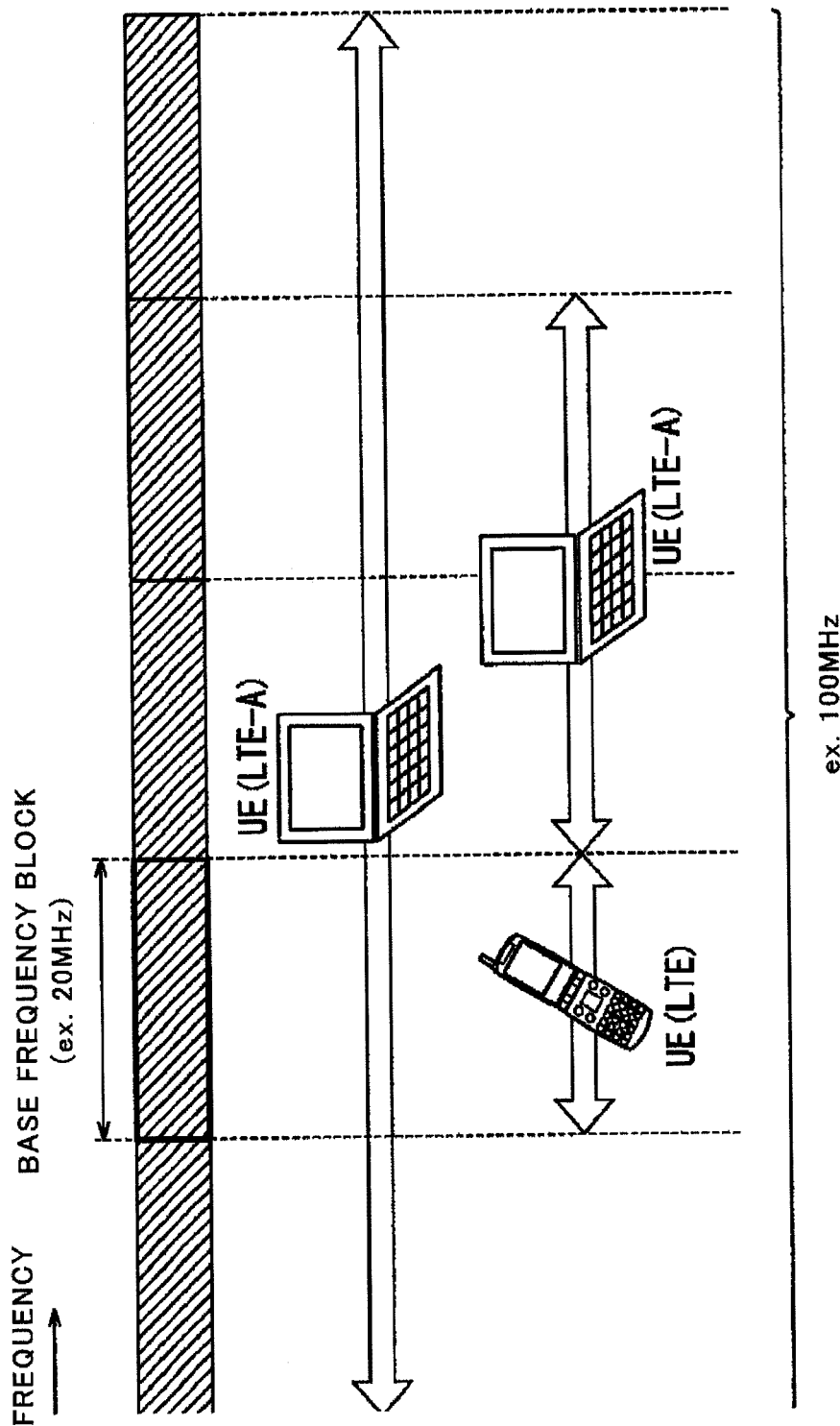
FIG. 1 is a conceptual diagram of a system band used in a mobile communication system according to an Embodiment of the invention.

FIG. 1 is a conceptual diagram of a system band used in a mobile communication system according to an Embodiment of the invention. As shown in FIG. 1, the system band used in the mobile communication system is divided using a base frequency block as a unit. The entire transmission band of the base station apparatus constituting the mobile communication system includes a plurality (herein, five) of base frequency blocks. The bandwidth of the base frequency block preferably ranges from about 15 to 20 MHz to support the LTE-capable UE (User Equipment). In the following description, described is the case where the bandwidth of the base frequency block is 20 MHz.

A plurality of base frequency blocks is flexibly assigned to an LTE-A-capable UE having the capability of transmission/reception bandwidth wider than 20 MHz based on frequency diversity gain and overhead of a control signal. For example, a single base frequency block is assigned to an LTE-capable UE having the capability of transmission/reception bandwidth of 20 MHz. Meanwhile, two base frequency blocks are assigned to an LTE-A-capable UE having the capability of transmission/reception bandwidth of 40 MHz. Further, five base frequency blocks are assigned to an LTE-A-capable UE having the capability of transmission/reception bandwidth of 100 MHz. In addition, the LTE-A-capable UE having the capability of transmission/reception bandwidth wider than 20 MHz maybe assigned base frequency blocks less than the transmission/reception bandwidth thereof, for example, a single base frequency block.

In the mobile communication system according to the Embodiment, under the environment that UEs with different transmission/reception bandwidths thus coexist, in the case of retransmitting a transmission signal to each of the UEs, the deterioration of retransmission efficiency is suppressed, and a transmission signal is retransmitted efficiently. More specifically, a transmission signal is divided into retransmission blocks in performing retransmission, according to a retransmission block table in which the number of blocks (retransmission blocks) is increased corresponding to the number of transmission antennas and registered, and the block is a retransmission unit of a transmission signal, and transmission signals associated with the divided retransmission blocks are retransmitted in downlink.

Figure 2:
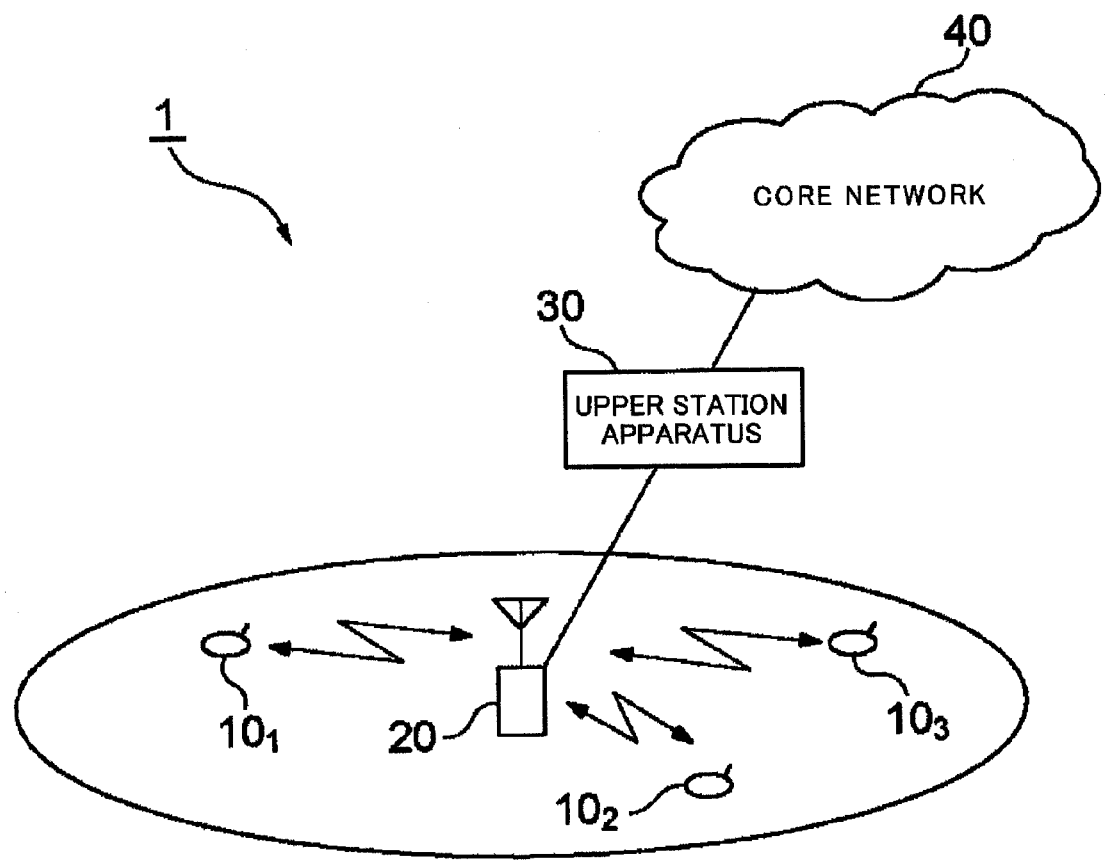
FIG. 2 is a diagram to explain a configuration of the mobile communication system having a base station apparatus and mobile terminal apparatuses (UEs) according to above-mentioned Embodiment.

FIG. 2 is a diagram to explain a configuration of a mobile communication system 1 having a base station apparatus 20 and mobile terminal apparatuses (UEs) 10 according to this Embodiment. In addition, the mobile communication system 1 as shown in FIG. 2 is a system including, for example, Evolved UTRA and UTRAN (alias: LTE (Long Term Evolution)) or SUPER 3G. Further, the mobile communication system 1 may be called IMT-Advanced or 4G.

As shown in FIG. 2, the mobile communication system 1 includes the base station apparatus 20 and a plurality of mobile terminal apparatuses 10 ($10_1$, $10_2$, $10_3$, ..., $10_n$, n is an integer where n>0) that communicate with the base station apparatus 20. The base station apparatus 20 is connected to an upper station apparatus 30, and the upper station apparatus 30 is connected to a core network 40. For example, the upper station apparatus 30 includes an access gateway apparatus, radio network controller (RNC), mobility management entity (MME), etc., but is not limited thereto.

In the mobile communication system 1, for example, Evolved UTRA, OFDMA (Orthogonal Frequency Division Multiple Access) is used in downlink, and SC-FDMA (Single Carrier Frequency Division Multiple Access) is used in uplink. OFDMA is a multicarrier transmission system for dividing a frequency band into a plurality of narrow frequency bands (subcarriers), and mapping data to each subcarrier to perform communications. SC-FDMA is a single-carrier transmission system for dividing a frequency band for each of mobile terminal apparatuses 10 so that the plurality of mobile terminal apparatuses 10 uses mutually different frequency bands, and thereby reducing interference among the mobile terminal apparatuses 10. In addition, a multicarrier transmission system may be used in uplink. In this case, for example, OFDM, Clustered DFT Spread OFDM, NxSC-FDMA or the like may be used in uplink (for example, see 3GPP, R1-082609, "Uplink Multiple access for LTE-Advanced", August 2008)

Figure 3:
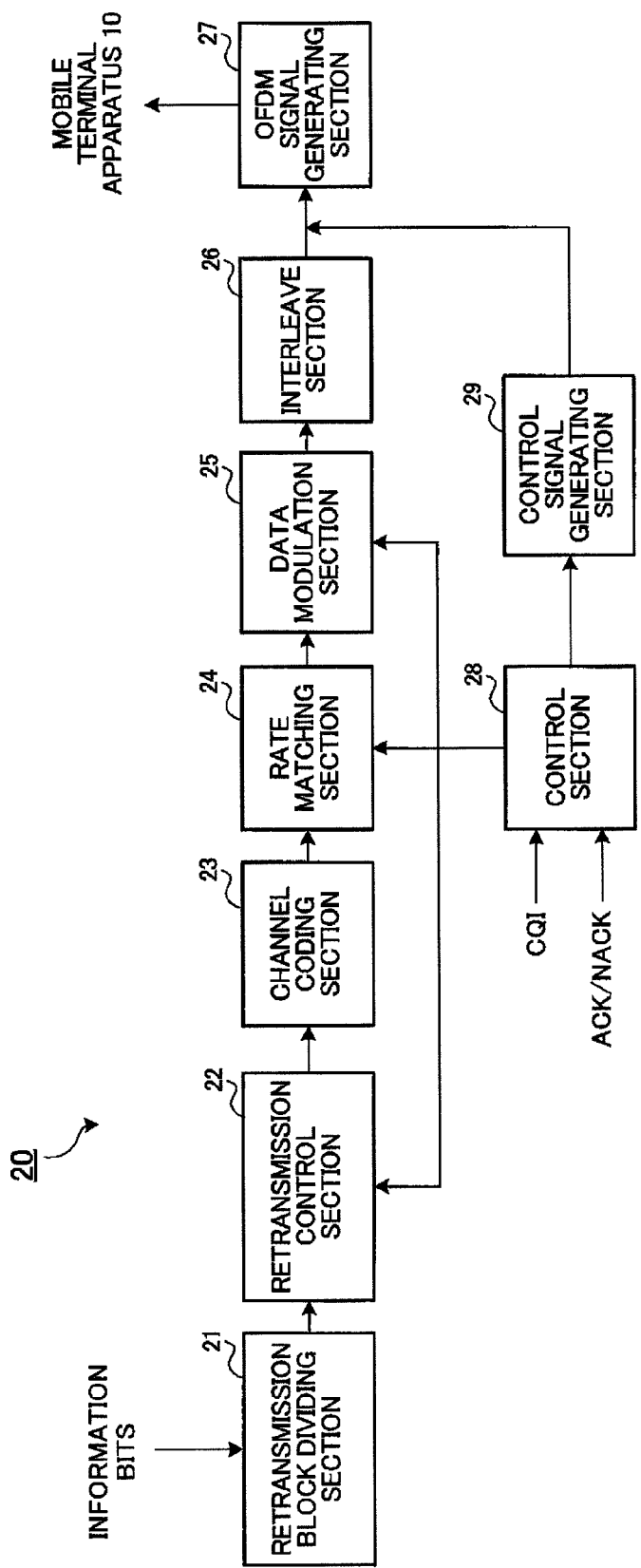
FIG. 3 is a functional block diagram of a transmission section that is a principal part of the base station apparatus that the mobile communication system has according to the above-mentioned Embodiment.
Figure 4:
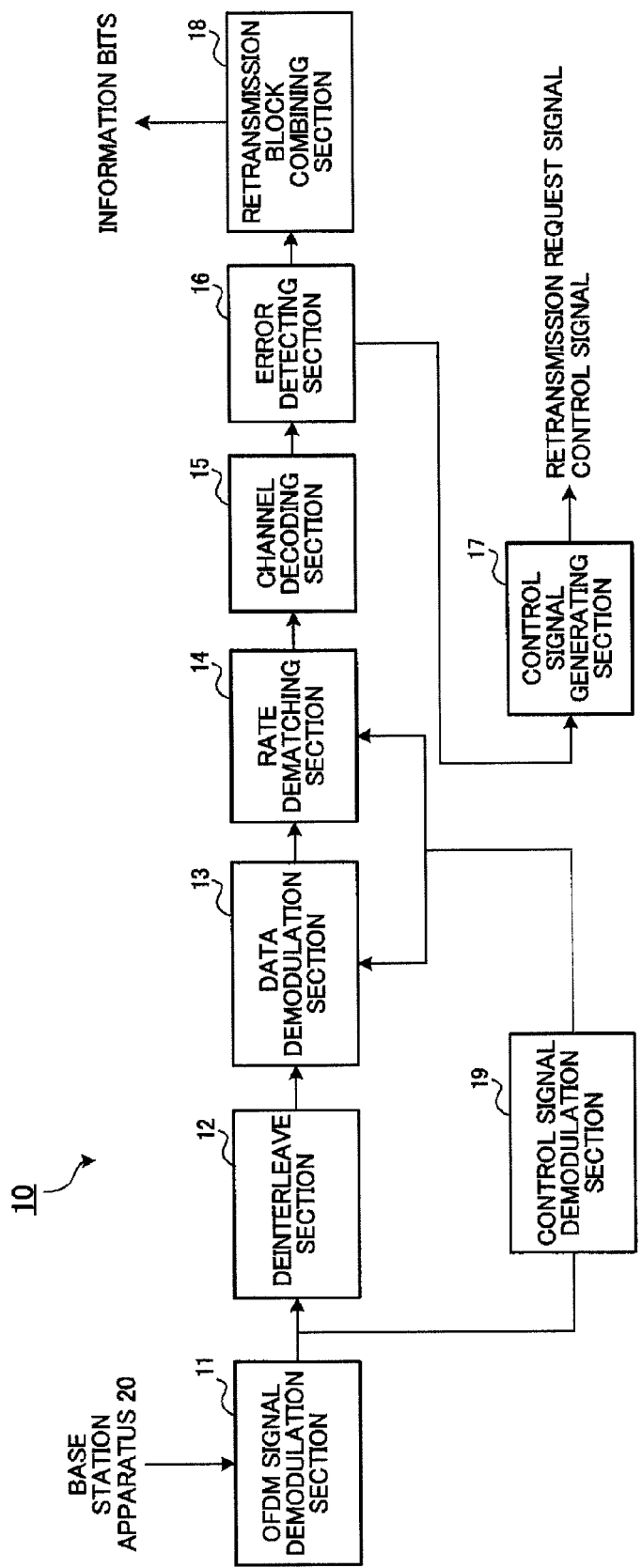
FIG. 4 is a functional block diagram of a reception section that is a principal part of the mobile terminal apparatus that the mobile communication system has according to the above-mentioned Embodiment.

Herein, described are configurations of principal parts of the base station apparatus 20 and mobile terminal apparatus 10 in the mobile communication system 1. FIG. 3 is a functional block diagram of a transmission section that is a principal part of the base station apparatus 20 in the mobile communication system according to this Embodiment. FIG. 4 is a functional block diagram of a reception section that is a principal part of the mobile terminal apparatus 10 in the mobile communication system 1 according to this Embodiment. In addition, the configuration of the base station apparatus 20 as shown in FIG. 3 is simplified to explain the invention, and is assumed to have a configuration including a reception section that a normal base station apparatus has. Further, the configuration of the mobile terminal apparatus 10 as shown in FIG. 4 is simplified to explain the invention, and is assumed to have a configuration including a transmission section that a normal mobile terminal apparatus has.

As shown in FIG. 3, the transmission section of the base station apparatus 20 according to this Embodiment has a retransmission block dividing section 21, retransmission control section 22, channel coding section 23, rate matching section 24, data modulation section 25, interleave section 26, OFDM signal generating section 27, control section 28, and control signal generating section 29. In addition, for example, the retransmission section in the scope of claims includes the retransmission control section 22, OFDM signal generating section 27 and radio transmission section not shown in the figure, and is comprised thereof.

In the transmission section of the base station apparatus 20 according to this Embodiment, the retransmission block dividing section 21 receives information bits constituting a transmission signal from an upper layer for processing the transmission signal. Further, the retransmission block dividing section 21 receives, from the upper layer, instructions (hereinafter, referred to as "retransmission block division instructions" as appropriate) for designating the number of retransmission blocks and the retransmission block size of the transmission signal at the retransmission in the base station apparatus 20, based on descriptions of a retransmission block table as described later.

The retransmission block dividing section 21, functions as the retransmission block dividing means, divides a transmission signal into retransmission blocks corresponding to the retransmission block division instructions from the upper station apparatus 30. In addition, the retransmission block division instructions include the number of retransmission blocks (the number of TBs) and the retransmission block size (BS) corresponding to the capability (for example, the system bandwidth capable of being supported, the number of transmission antennas, etc.) of the mobile terminal apparatus 10 to be communication. The retransmission block dividing section 21 divides the transmission signal into retransmission blocks corresponding to the number of retransmission blocks and the retransmission block size included in the retransmission block division instructions.

Herein, described are descriptions of the retransmission block table that the base station apparatus 20 refers to in performing retransmission according to this Embodiment. FIG. 5 is a diagram showing an example of the retransmission block table that the base station apparatus 20 refers to in performing retransmission according to this Embodiment. The retransmission block table as shown in FIG. 5 shows the relationships between the system bandwidth and the number of transmission antennas, and between the number of retransmission blocks and the retransmission block size, and particularly, shows 20 MHz, 40 MHz, 80 MHz and 100 MHz as the system bandwidth. Further, the "layer" as shown in FIG. 5 corresponds to the number of transmission antennas, and the retransmission block size in each layer indicates the maximum block size in the corresponding system bandwidth, which is the same as in retransmission tables described below.

In the retransmission block table as shown in FIG. 5, the number of blocks is registered so as to increase corresponding to the number of transmission antennas. More specifically, in the retransmission block table as shown in FIG. 5, irrespective of the system bandwidth, the number of retransmission blocks is set at the same number as the number of the transmission antennas. In other words, in the case of a single transmission antenna (in the case of layer 1), a single retransmission block is associated, irrespective of the system bandwidth, and in the case of eight transmission antennas (in the case of layer 8), eight retransmission blocks are associated, irrespective the system bandwidth. In other words, the information bits constituting the transmission signal are divided by the number of retransmission blocks associated with the number of transmission antennas. With respect to the retransmission block size, the retransmission block size when the number of transmission antennas is one and the system bandwidth is 20 MHz is set as a reference retransmission block size (75,000 bits), and the retransmission block size is set corresponding to the number of transmission antennas and the system bandwidth. In other words, the retransmission block size is set at 75,000 bits when the system bandwidth is 20 MHz, while being set at 150,000 bits, 300,000 bits or 375,000 bits when the system bandwidth is 40 MHz, 80 MHz or 100 MHz, respectively.

Figure 6:
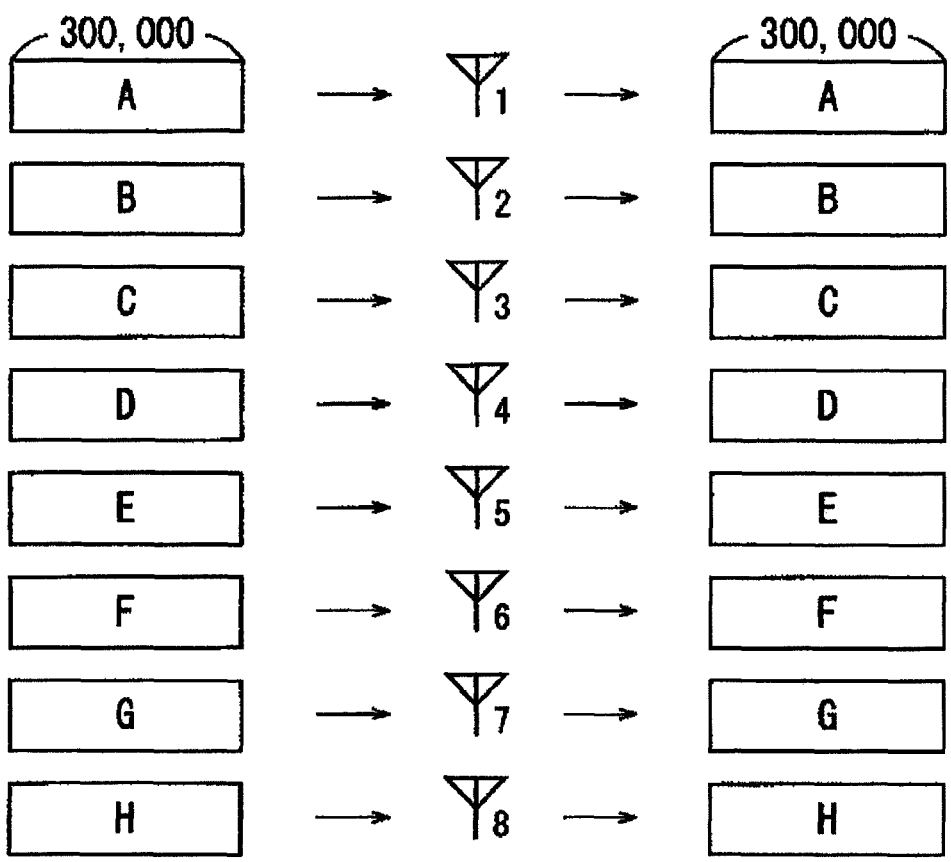
FIG. 6 is a conceptual diagram of retransmission blocks transmitted from the base station apparatus according to the retransmission block table as shown in FIG. 5.

FIG. 6 shows a conceptual diagram of retransmission blocks transmitted from the base station apparatus 20 according to the retransmission block table as shown in FIG. 5. FIG. 6 shows the case where the number of transmission antennas is one and the system bandwidth is 100 MHz (FIG. 6(*a*)), and the case where the number of transmission antennas is eight and the system bandwidth is 80 MHz (FIG. 6(*b*)). As shown in FIG. 6(*a*), in the case where the number of transmission antennas is one and the system bandwidth is 100 MHz, the number of retransmission blocks is one, the retransmission block size is set at 375,000 bits, and a transmission signal A of 375,000 bits is transmitted from a transmission antenna 1. Further, as shown in FIG. 6(*b*), in the case where the number of transmission antennas is eight and the system bandwidth is 80 MHz, the number of retransmission blocks is eight, the retransmission block size is set at 300,000 bits, and transmission signals A to H of 300,000 bits are transmitted from transmission antennas 1 to 8, respectively.

The retransmission control section 22 receives the information bits associated with the retransmission block divided by the retransmission block dividing section 21, and performs retransmission on a retransmission block basis. In this case, the retransmission control section 22 outputs the information bits associated with each retransmission block to the channel coding section 23 according to retransmission timing from the control section 28.

The channel coding section 23 performs error correcting coding on the information bits associated with each retransmission block received from the retransmission control section 22, and outputs transmission bits obtained by adding redundant bits to the information bits to the rate matching section 24. In addition, to improve efficiency of the decoding processing in the mobile terminal apparatus 10, the channel coding section 23 is configured to perform coding by dividing the information bits into a plurality of coding blocks when the information bits associated with each retransmission block are a certain size (for example, 6144 bits) or more.

The rate matching section 24, functions as the coding rate adjusting means, performs repetition and puncturing on the transmission bits to adjust the coding rate of the information bits (rate matching processing), and outputs the resultant to the data modulation section 25. In this case, the repetition and puncturing in the rate matching section 24 is performed based on the coding information notified from the control section 28 corresponding to the content of a retransmission request signal from the mobile terminal apparatus 10. The rate matching section 24 adjusts the coding rate of the information bits corresponding to the coding information, and outputs information bits with the different coding rate to the data modulation section 25. As specifically described later, the rate matching section 24 thus adjusts the coding rate of the information bits corresponding to the coding information associated with the retransmission request signal from the mobile terminal apparatus 10, it is thereby possible to adjust the coding rate in retransmission control, corresponding to an error detection result in the mobile terminal apparatus 10, and it is possible to achieve efficient retransmission control.

The data modulation section 25 modulates the information bits input from the rate matching section 24, for example, using a modulation scheme such as Phase Shift Keying (BPSK, QPSK, 8PSK, etc.) or Quadrature Amplitude Modulation (QAM) scheme. In this case, modulation on the information bits in the data modulation section 25 is performed according to the modulation scheme notified from the control section 28. The modulation scheme notified from the control section 28 is selected based on the CQI (Channel Quality Indicator) notified from the mobile terminal apparatus 10.

The interleave section 26, functions as the interleave means, rearranges (interleaves) the sequence of the information bits and redundant bits modulated in the data modulation section 25, and enhances resistance to burst error. In this case, the interleave section 26 is configured to use the entire system bandwidth that can be supported by the mobile terminal apparatus 10 to perform interleaving. Herein, described is an example of information bits and redundant bits interleaved in the interleave section 26 of the base station apparatus 20 according to this Embodiment.

Figure 7:
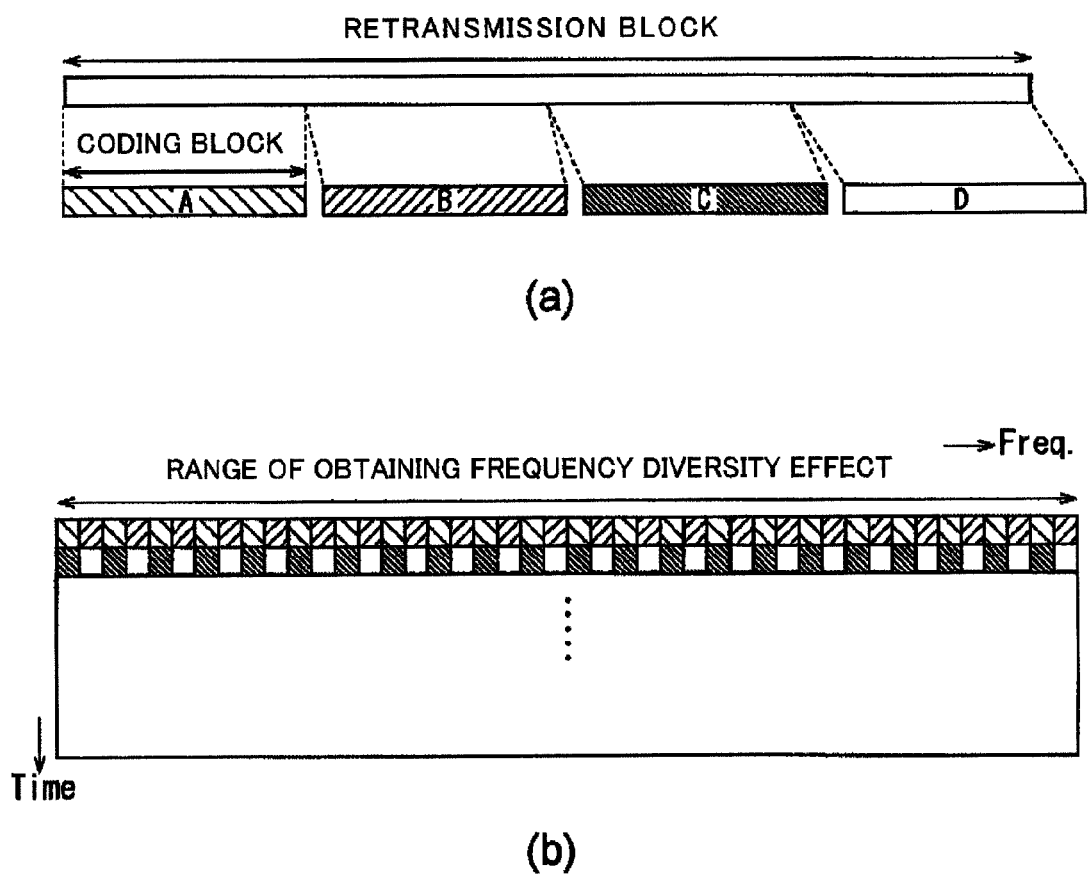
FIG. 7 is a schematic diagram to explain an example of information bits and redundant bits rearranged in an interleave section of the base station apparatus according to the above-mentioned Embodiment.

FIG. 7 is a schematic diagram to explain an example of information bits and redundant bits interleaved in the interleave section 26 of the base station apparatus 20 according to this Embodiment. Herein, for convenience in description, as shown in FIG. 7(a), it is assumed that a single retransmission block is divided into four coding blocks A to D to undergo error correcting coding. In this case, as shown in FIG. 7(b), the interleave section 26 rearranges the information bits and redundant bits of the coding blocks A and B using the entire system bandwidth. Similarly, the interleave section 26 interleaves the information bits and redundant bits of the coding blocks C and D in the entire system bandwidth. In this case, it is possible to obtain the frequency diversity effect in the entire system bandwidth.

Figure 8:
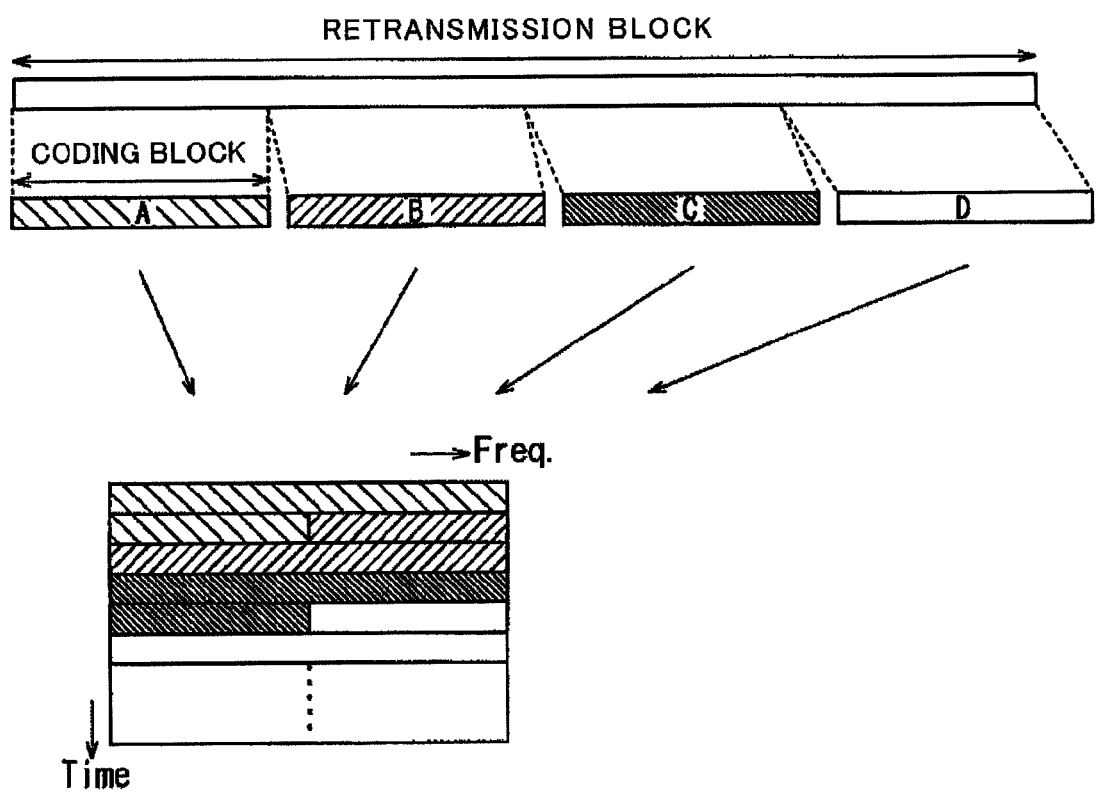
FIG. 8 is a schematic diagram to explain details of interleaving in a conventional mobile communication system.
Figure 9:
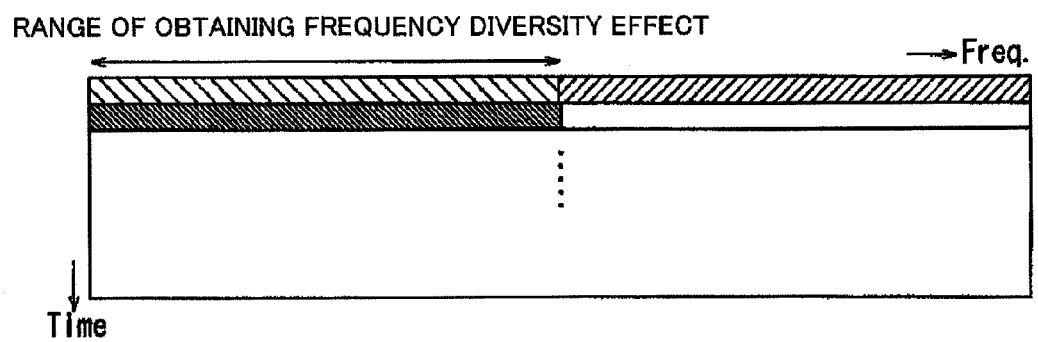
FIG. 9 is a diagram to explain the scope of the diversity effect obtained in interleaving in the conventional mobile communication system.

In addition, conventional interleaving on information bits and redundant bits is performed on a coding-block basis. In other words, the interleaving is performed only within the coding block. Therefore, as shown in FIG. 8, the rearranged information bits and redundant bits are mapped on a coding-block basis. When the system bandwidth is a relatively narrow bandwidth, as shown in FIG. 8, it is possible to perform mapping over a plurality of unit times. However, when interleaving is performed on a coding-block basis as described above in the case where the system bandwidth is extended, as shown in FIG. 9, such an event can occur that the information bits and redundant bits are mapped only to part of frequency bands at the unit time. In this case, the frequency diversity effect can be obtained only in part of the system bandwidth, and reception characteristics of the reception signal may deteriorate. Therefore, the interleave section 26 performs interleaving in the entire system bandwidth. By this means, as compared with the case of performing interleaving only within the coding block, it is possible to obtain the excellent frequency diversity effect, and it is possible to enhance reception characteristics of the reception signal in the mobile terminal apparatus 10.

In the example as shown in FIG. 7, for convenience in description, the case is shown where the sequence of the information bits and redundant bits associated with a single retransmission block is interleaved using the entire system bandwidth. In the case where a plurality of retransmission blocks exists (for example, in the case where a retransmission block is assigned for each base frequency block (20 MHz) in a system having the system bandwidth of 80 MHz), the interleave section 26 is configured to be able to exchange the sequence of information bits and redundant bits among the retransmission blocks using the entire system bandwidth. Herein, described is an example of information bits and redundant bits interleaved in the interleave section 26 when a plurality of retransmission blocks exists.

Figure 10:
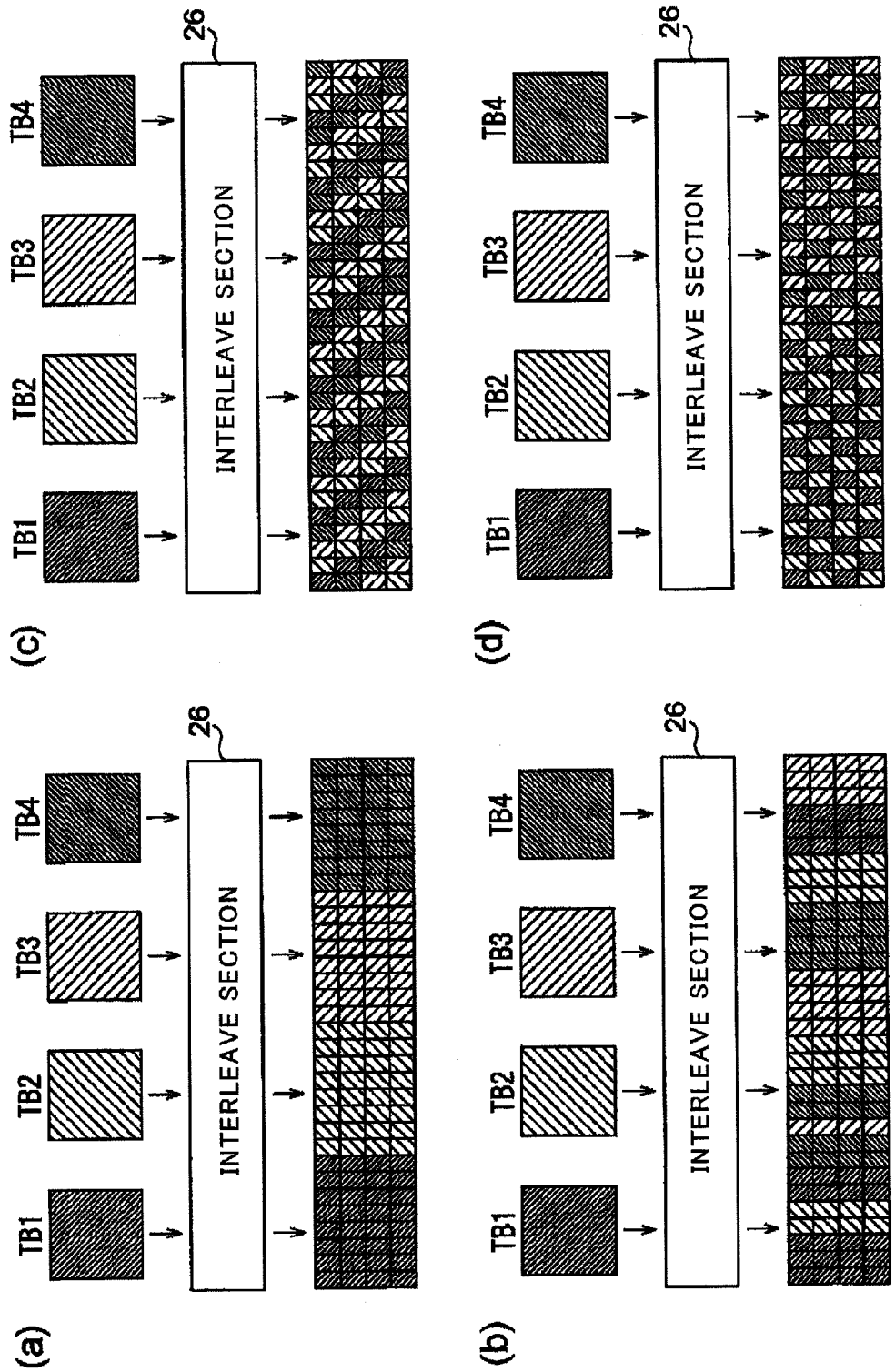
FIG. 10 is a schematic diagram to explain another example of information bits and redundant bits rearranged in the interleave section of the base station apparatus according to the above-mentioned Embodiment.

FIG. 10 is a schematic diagram to explain an example of information bits and redundant bits interleaved in the interleave section 26 of the base station apparatus 20 according to this Embodiment. Herein, it is assumed that the system bandwidth is 80 MHz, and that four retransmission blocks (TB1 to TB4) exist in association with each base frequency block. Further, in FIG. 10, for convenience in description, the case is shown where each retransmission block is not divided into a plurality of coding blocks, but it is naturally possible to apply in the case where each retransmission block is divided into a plurality of coding blocks.

FIG. 10(a) shows a state before the rearrangement of the information bits and redundant bits associated with each retransmission block. FIG. 10(b) shows the case where the sequence of the information bits and redundant bits associated with each retransmission block is spreaded in the frequency-axis direction and rearranged. FIG. 10(c) shows the case where the sequence of the information bits and redundant bits associated with each retransmission block is spreaded in the frequency-axis direction and the time-axis direction and rearranged. FIG. 10(d) shows the case where the sequence of the information bits and redundant bits associated with retransmission blocks TB1 and TB2 is spreaded in the frequency-axis direction and the time-axis direction within two base frequency blocks and rearranged, while the sequence of the information bits and redundant bits associated with retransmission blocks TB3 and TB4 is spreaded in the frequency-axis direction and the time-axis direction within two base frequency blocks and rearranged. In the case that a plurality of retransmission blocks thus exists, the interleave section 26 is capable of exchanging the sequence of information bits and redundant bits among retransmission blocks using the entire system bandwidth, and it is thus possible to obtain the frequency diversity effect in the entire system bandwidth.

The OFDM signal generating section 27 modulates the transmission signal input from the interleave section 26 with the OFDM scheme, together with a control signal generated in the control signal generating section 29, and generates an OFDM signal. For example, the OFDM signal generating section 27 performs processing of subcarrier mapping, IFFT, addition of guard interval, etc. The OFDM signal generated in the OFDM signal generating section 27 is output to a radio transmission section, not shown, and the radio signal is transmitted to the mobile terminal apparatus 10.

The control section 28 performs entire control of the base station apparatus 20. Particularly, the control section 28 gives instructions for retransmission timing to the retransmission control section 22, while notifying the rate matching section 24 and data modulation section 25 of the information required for the processing therein. More specifically, the control section 28 identifies coding information corresponding to ACK (Acknowledgement) or NACK (Negative Acknowledgement) constituting a retransmission request signal transmitted from the mobile terminal apparatus 10, and notifies the rate matching section 24 of the coding information. Further, the control section 28 selects a modulation scheme based on the downlink CQI measured in the mobile terminal apparatus 10, and notifies the data modulation section 25 of the modulation scheme. Furthermore, the control section 28 instructs the control signal generating section 29 to generate a control signal including the coding information notified to the rate matching section 24 and the modulation scheme notified to the data modulation section 25.

The control signal generating section 29 generates a control signal to transmit to the mobile terminal apparatus 10, corresponding to the instructions from the control section 28.

In addition, this control signal includes the coding information notified to the rate matching section 24 and the modulation scheme notified to the data modulation section 25. Further, when the data modulation section 25 performs MIMO modulation, the control signal also includes the number of spatial multiplexes corresponding to the number of transmission antennas. The control signal generated in the control signal generating section 29 is output to the OFDM signal generating section 27, and as described above, incorporated into part of the OFDM signal, and the radio signal is transmitted to the mobile terminal apparatus 10.

Meanwhile, as shown in FIG. 4, the reception section of the mobile terminal apparatus 10 according to this Embodiment has an OFDM signal demodulation section 11, deinterleave section 12, data demodulation section 13, rate dematching section 14, channel decoding section 15, error detecting section 16, control signal generating section 17, retransmission block combining section 18, and control signal demodulation section 19, and is comprised thereof. In addition, for example, the reception section in the scope of claims includes a radio reception section not shown in the figure, and OFDM signal demodulation section 11, and is comprised thereof.

The OFDM signal demodulation section 11 demodulates the reception signal, modulated with the OFDM scheme, received from the base station apparatus 20 via the radio reception section, not shown in the figure, and extracts a baseband signal. For example, the OFDM signal demodulation section 11 performs processing of removal of guard interval, Fourier transform, subcarrier demapping, etc. on the reception signal, and extracts the data signal and control signal. The data signal and control signal extracted in the OFDM signal demodulation section 11 are respectively output to the deinterleave section 12 and control signal demodulation section 19.

The deinterleave section 12 performs deinterleaving on the data signal input from the OFDM signal demodulation section 11, and restores the information bits and redundant bits rearranged in the interleave section 26 in the base station apparatus 20 to the original sequence. In this case, the deinterleave section 12 beforehand recognizes the content of rearrangement of the information bits and redundant bits performed in the interleave section 26 in the base station apparatus 20, and is capable of properly performing deinterleaving of the received data signal.

The data demodulation section 13 demodulates the data signal input from the deinterleave section 12, for example, using information of the modulation scheme such as Phase Shift Keying (BPSK, QPSK, 8PSK, etc.) or Quadrature Amplitude Modulation (QAM) scheme, and outputs the resultant to the rate dematching section 14. In this case, demodulation on the data signal in the data demodulation section 13 is performed according to the information of the modulation scheme notified from the control signal demodulation section 19.

Further, the data demodulation section 13 has the function as a MIMO demodulation section. In this case, using the information of the number of spatial multiplexes and modulation scheme, the data demodulation section 13 divides the transmission signal transmitted from each transmission antenna of the base station apparatus 20 to demodulate, and outputs information bits and redundant bits included in all the concurrently transmitted transmission signals to the rate dematching section 14.

The rate dematching section 14 deletes information bits subjected to repetition, while adding information bits subjected to puncturing (rate dematching processing) in the data signal input from the data demodulation section 13, and outputs the resultant to the channel decoding section 15. In this case, deletion in repetition and addition in puncturing in the rate dematching section 14 is performed base on the coding information notified from the control signal demodulation section 19. In addition, this coding information is extracted from the control signal transmitted from the base station apparatus 20. Therefore, the rate dematching section 14 is capable of properly deleting the information bits repeated in the base station apparatus 20, while properly adding the information bits punctured in the base station apparatus 20.

The channel decoding section 15 performs error correcting decoding on the data signal input from the rate dematching section 14, and outputs the information bits and redundant bits obtained thereby to the error detecting section 16. For example, the channel decoding section 15 is configured to make the soft decision on each information bit subjected to the rate dematching processing, and perform error correcting decoding using likelihood values associated with the information bits and redundant bits constituting the data signal, based on the likelihood value calculated corresponding to each information bit.

The error detecting section 16 detects an error of the information bits using an error detecting code such as a CRC (Cyclic Redundancy Check) code added to the information bits. Particularly, the error detecting section 16 is capable of detecting an error on a basis of a coding block divided from the retransmission block in the base station apparatus 20. Then, the error detecting section 16 notifies the control signal generating section 17 of the result of error detection, while outputting the information bits to the retransmission block combining section 18 when the error is not detected.

The control signal generating section 17 functions as the retransmission request signal generating sections, and when the error is detected in the information bits as a result of error detection, generates a retransmission request signal for feedback to the base station apparatus 20. The control signal generating section 17 is capable of generating a retransmission request signal (ACK, NACK) indicative of the content of a plurality of kinds of error detection results. The generated retransmission request signal is transmitted to the base station apparatus 20 from a radio transmission section not shown in the figure. Further, the control signal generating section 17 also has the function of receiving a downlink CQI measured in a CQI measuring section, not shown in the figure, and generating a control signal including the CQI.

Herein, described are details of the retransmission request signal generated in the control signal generating section 17. FIG. 11 is a diagram to explain an example of the retransmission request signal generated in the control signal generating section 17 of the mobile terminal apparatus 10 according to this Embodiment. As shown in FIG. 11, the control signal generating section 17 generates retransmission request signals comprised of 2 bits. Among 2 bits constituting the retransmission request signal, "00" is assigned ACK, and "01", "10" and "11" are assigned NACK. Each of three NACKs is associated with the meaning indicative of a ratio (ratio of erroneous coding blocks to all the coding blocks) of coding blocks (hereinafter, referred to as "erroneous coding blocks" as appropriate) erroneously detected in the error detecting section 16. For example, "01" is associated with the meaning that the erroneous coding blocks are ⅓ or less, "10" is associated with the meaning that the erroneous coding blocks are more than ⅓ up to ⅔ or less, and "11" is associated with the meaning that the erroneous coding blocks are more than ⅔.

The control signal generating section 17 generates these retransmission request signals corresponding to the error detection result in the error detecting section 16, and transmits the signals to the base station apparatus 20 via the radio transmission section, not shown. In the base station apparatus 20, when the retransmission request signals are received, the control section 28 identifies the content of the meaning, and the rate matching section 24 adjusts the coding rate corresponding to the ratio of the erroneous coding blocks indicated by the retransmission request signal so as to transmit a transmission packet. For example, as shown in FIG. 11, when ACK ("00") is received as a retransmission request signal, the section 24 adjusts to the coding rate for new transmission so as to transmit a transmission packet. Meanwhile, when NACK ("01") is received, the section 24 adjusts to the coding rate for adding the shortest redundant bits so as to transmit a transmission packet. Further, when NACK ("10") is received, the section 24 adjusts to the coding rate for adding the short redundant bits so as to transmit a transmission packet. Furthermore, when NACK ("11") is received, the section 24 adjusts to the coding rate for adding the longest redundant bits so as to transmit a transmission packet. The base station apparatus 20 is thus capable of transmitting the transmission packet with the result of error detection in the mobile terminal apparatus 10 reflected.

Thus, in the mobile communication system 1 according to this Embodiment, the mobile terminal apparatus 10 generates a plurality of kinds of retransmission request signals indicative of ratios in error detection of the reception signal to transmit to the base station apparatus 20, and is capable of suitably notifying the base station apparatus 20 of the ratio in error detection of the reception signal. Then, corresponding to the retransmission request signal, the rate matching section 24 in the base station apparatus 20 adjusts the coding rate of the transmission signal, and it is thereby possible to reflect the ratio in error detection in the transmission signal, and to achieve efficient retransmission control.

The retransmission block combining section 18 functions as the retransmission block combining means, and combines information bits input from the error detecting section 16 to restore to the transmission signal in the state before being divided into retransmission blocks in the base station apparatus 20. Then, the retransmission block combining section 18 outputs, as reception data, the information bits constituting the transmission signal in the state prior to division to the upper layer for processing the reception data.

The control signal demodulation section 19 demodulates the control signal input from the OFDM signal demodulation section 11, and extracts the coding information and modulation scheme included in the control signal. the extracted modulation scheme is notified to the data demodulation section 13, while the extracted coding information is notified to the rate dematching section 14. In addition, when the control signal includes the number of spatial multiplexes corresponding to the number of transmission antennas in the base station apparatus 20, the section 19 extracts the number of spatial multiplexes to notify the data demodulation section 13.

Figure 12:
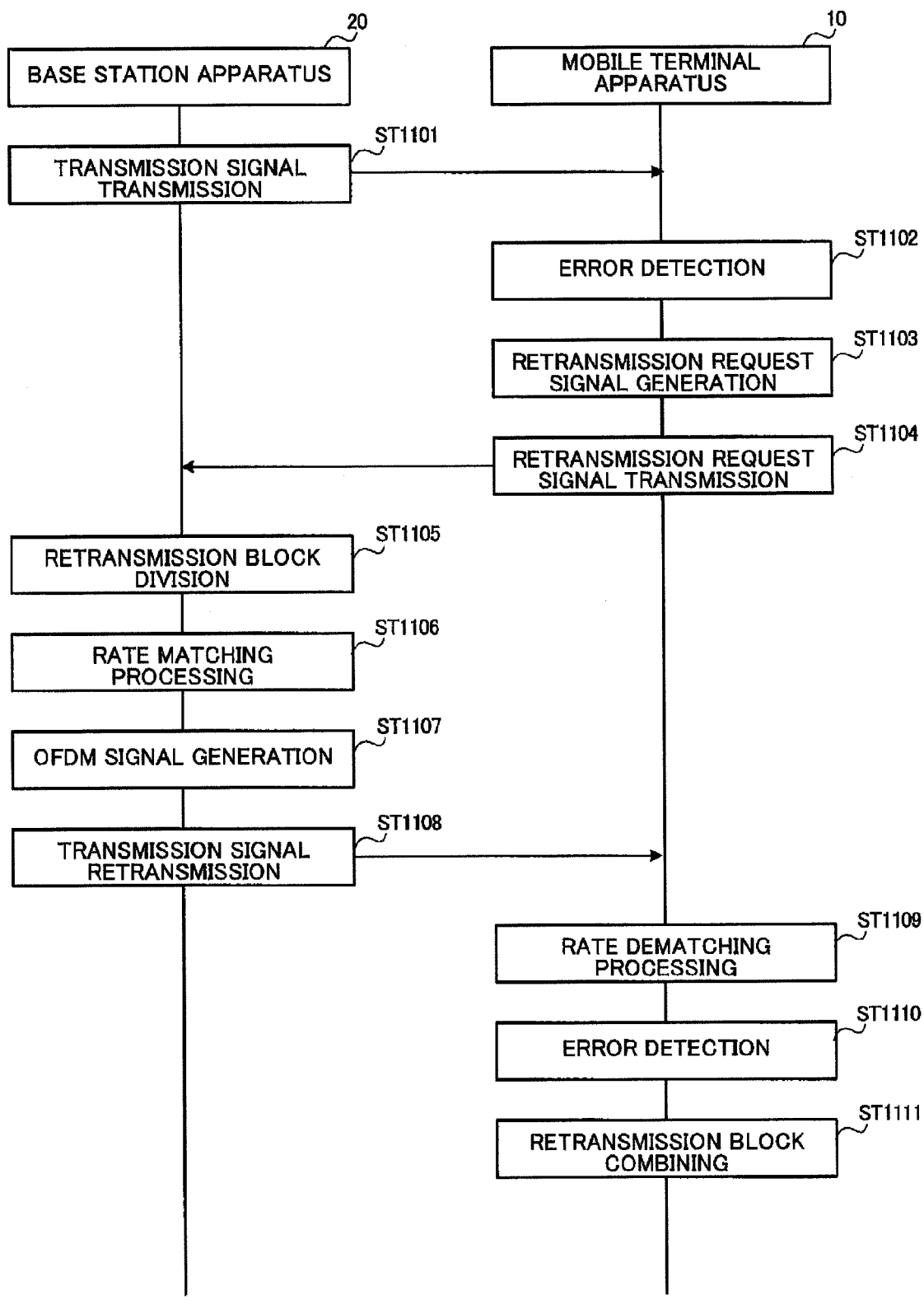
FIG. 12 is a sequence diagram to explain operation in the case that the base station apparatus retransmits a transmission signal to the mobile terminal apparatus according to the above-mentioned Embodiment.

Described next is operation in the case that the base station apparatus 20 having the above-mentioned configuration retransmits a transmission signal to the mobile terminal apparatus 10. FIG. 12 is a sequence diagram to explain the operation in the case that the base station apparatus 20 retransmits a transmission signal to the mobile terminal apparatus 10 according to this Embodiment. In addition, in the sequence as shown in FIG. 12, described is the processing after the base station apparatus 20 transmits a transmission signal to the mobile terminal apparatus 10 according to the normal processing. Further, for convenience in description, FIG. 12 shows the sequence simplified to explain the invention, but it is assumed that the normally required processing is performed when the base station apparatus 20 retransmits a transmission signal to the mobile terminal apparatus 10.

As shown in FIG. 12, when the base station apparatus 20 transmits a transmission signal (step ST1101), the mobile terminal apparatus performs the OFDM signal demodulation processing, deinterleaving processing, data demodulation processing, rate dematching processing and channel decoding processing on the reception signal, and then, the information bits and redundant bits included in the reception signal are input to the error detecting section 16. Then, the error detecting section 16 performs error detection (step ST1102), and outputs the error detection result to the control signal generating section 17. In this case, the error detecting section 16 inputs the ratio of coding blocks (erroneous coding blocks) in which errors are detected to the control signal generating section 17.

Upon receiving the error detection result, the control signal generating section 17 generates a retransmission request signal (step ST1103). As described above, the retransmission request signal is comprised of a control signal of 2 bits of the content as shown in FIG. 11 based on the error detection result. In this case, the control signal generating section 17 generates a retransmission request signal ("00", "01", "10" and "11") corresponding to the ratio of the erroneous coding blocks to the coding blocks constituting the reception signal, and the retransmission request signal is transmitted in uplink to the base station apparatus 20 (step ST1104).

Upon receiving the retransmission request signal, in the base station apparatus 20, information bits constituting a transmission signal targeted for a retransmission request are input to the retransmission block dividing section 21, the capability (for example, the support-capable system bandwidth, the number of antennas, etc.) of the mobile terminal apparatus 10 that is a transmission source of the retransmission request signal is determined, and the transmission signal is divided into retransmission blocks corresponding to the capability (step ST1105). In this case, the transmission signal is divided into retransmission blocks based on the descriptions of the retransmission block table shown in FIG. 5 corresponding to the determined capability of the mobile terminal apparatus 10. In other words, the transmission signal is divided into retransmission blocks of the number of retransmission blocks corresponding to the support-capable system bandwidth and the number of transmission antennas, and it is thereby possible to avoid events of retransmission blocks having the remarkably large retransmission block sizes.

Meanwhile, the control section 28 identifies the coding information from the content of (ACK or NACK constituting) the retransmission request signal to input to the rate matching section 24. Then, the rate matching section 24 performs repetition and puncturing on transmission bits based on the coding information indicated from the control section 28, and adjusts the coding rate of the information bits (rate matching processing: step ST1106). In this case, the coding rate is adjusted corresponding to the ratio of the erroneous coding blocks detected in the mobile terminal apparatus 10.

After the data modulation processing and interleaving processing is thus performed on the information bits and redundant bits obtained in the rate matching processing, the resultant is input to the OFDM signal generating section 27. Then, the OFDM signal generating section 27 generates an OFDM signal (step ST1107), and the OFDM signal is retransmitted to the mobile terminal apparatus 10 in downlink as a transmission signal (step ST1108).

Upon receiving the transmission signal from the base station apparatus 20, the mobile terminal apparatus 10 performs the OFDM signal demodulation processing, deinterleaving processing, and data demodulation processing on the reception signal, and then, the data signal is input to the rate dematching section 14. The rate dematching section 14 deletes information bits subjected to repetition, while adding information bits subjected to puncturing in the input data signal, based on the coding information from the base station apparatus 20 demodulated in the control signal demodulation section 19 (rate dematching processing: step ST1109). The channel decoding processing is performed on the data signal subjected to the rate dematching processing, and then, the information bits and redundant bits included in the data signal are input to the error detecting section 16. Then, the error detecting section 16 performs error detection (step ST1110).

In addition, herein, it is assumed that the error detecting section 16 does not detect any erroneous coding block. In this case, the error detecting section 16 inputs the information bits to the retransmission block combining section 18, and the retransmission block combining section 18 restores the retransmission blocks of the transmission signal that is divided in the base station apparatus 20 (step ST1111). The information bits restored to the retransmission blocks prior to division are output to the upper layer for processing the reception data, and undergo the predetermined processing. In this way, a series of processing is finished in the case that the base station apparatus 20 retransmits a transmission signal to the mobile terminal apparatus 10.

Thus, in the mobile communication system 1 according to this Embodiment, a transmission signal is divided into retransmission blocks according to a retransmission block table in which the number of retransmission blocks each of which is a retransmission unit of a transmission signal is increased corresponding to the number of transmission antennas and registered, transmission signals associated with the retransmission blocks are retransmitted in downlink, it is thereby possible to increase the number of retransmission blocks in retransmitting a transmission signal corresponding to the number of transmission antennas, it is thus possible to prevent the occurrence of circumstances that retransmission of a retransmission block having a large retransmission block size is repeated due to a transmission error, and therefore, also in the case that the system bandwidth is extended, it is possible to suppress deterioration of retransmission efficiency and to retransmit a transmission signal efficiently.

Particularly, in the mobile communication system 1 according to this Embodiment, as shown in FIG. 5, the transmission signal is divided into retransmission blocks according to the retransmission block table in which the number of retransmission blocks is set at the same as the number of transmission antennas, it is possible to unify the retransmission block size in each system bandwidth, and it is possible to avoid such an event that a retransmission block having the remarkably large retransmission block size occurs and that retransmission efficiency deteriorates.

Further, in the mobile communication system 1 according to this Embodiment, as shown in FIG. 5, in the case of four or more transmission antennas, the number of retransmission blocks is set at four or eight. By this means, it is possible to reduce the number of processing times required for signal division, for example, in the case where SIC (Successive Interference Controller) is applied as the signal dividing method in the multi-antenna radio transmission technique, and it is possible to enhance efficiency in the signal division processing.

In addition, the above-mentioned Embodiment describes the case where the retransmission block table that the base station apparatus 20 refers to in performing retransmission control associates the same number of retransmission blocks as the number of transmission antennas irrespective of the system bandwidth (see FIG. 5). However, the descriptions set in the retransmission block table that the base station apparatus 20 refers to in performing retransmission control are not limited thereto, and are capable of being modified as appropriate. For example, as shown in FIG. 13(a), irrespective of the system bandwidth, the number of retransmission blocks may be set at one when the number of transmission antennas is one, while being set at two when the number of transmission antennas is two or more. Further, as shown in FIG. 13(b), irrespective of the system bandwidth, the number of retransmission blocks may be set at the same as the number of transmission antennas when the number of transmission antennas is four or less, while being set at four when the number of transmission antennas is eight. In this case, as in the above-mentioned Embodiment, it is possible to prevent an event that retransmission of a retransmission block having the large retransmission block size is repeated due to the transmission error to achieve efficient retransmission control, while it is possible to reduce the number of processing times required for signal division in the case where SIC (Successive Interference Canceller) is applied as the signal dividing method in the multi-antenna radio transmission technique, and it is possible to enhance efficiency in the signal division processing.

In the case of the retransmission block table as shown in FIG. 13(a), in each system bandwidth, the retransmission block table differs from the retransmission block table as shown in FIG. 5 in the respects that the retransmission block size is two times that in the case of two transmission antennas when the number of transmission antennas is four, and that the retransmission block size is four times that in the case of two transmission antennas when the number of transmission antennas is eight. More specifically, when the system bandwidth is 80 MHz, the retransmission block size is set at 600,000 bits and 1,200,000 bits in the case that the number of transmission antennas is four and eight, respectively. Meanwhile, in the case of the retransmission block table as shown in FIG. 13(b), in each system bandwidth, the retransmission block table differs from the retransmission block table as shown in FIG. 5 in the respect that the retransmission block size is two times that in the case of four transmission antennas when the number of transmission antennas is eight. More specifically, when the system bandwidth is 80 MHz, the retransmission block size is set at 600,000 bits in the case that the number of transmission antennas is eight.

FIG. 14 shows a conceptual diagram of retransmission blocks transmitted from the base station apparatus 20 according to the retransmission block table as shown in FIG. 13. FIG. 14(a) shows a conceptual diagram of retransmission blocks in the case where the number of transmission antennas is eight and the system bandwidth is 80 MHz in the retransmission block table as shown in FIG. 13(a). FIG. 14(b) shows a conceptual diagram of retransmission blocks in the case where the number of transmission antennas is eight and the system bandwidth is 80 MHz in the retransmission block table as shown in FIG. 13(b). As shown in FIG. 14(a), in the case of following the retransmission block table as shown in FIG. 13(a), when the number of transmission antennas is eight and the system bandwidth is 80 MHz, the number of retransmission blocks is two, the retransmission block size is set at 1,200,000 bits, and transmission signals A to H each of 300,000 bits are transmitted from transmission antennas 1 to 8, respectively. Meanwhile, as shown in FIG. 14(b), in the case of following the retransmission block table as shown in FIG. 13(b), when the number of transmission antennas is eight and the system bandwidth is 80 MHz, the number of retransmissions blocks is four, the retransmission block size is set at 600,000 bits, and transmission signals A to H each of 300,000 bits are transmitted from transmission antennas 1 to 8, respectively.

Further, in the retransmission block table, as shown in FIG. 15, it is also possible to set the number of retransmission blocks corresponding to the system bandwidth, using the number of retransmission blocks in 20 MHz that is the base frequency block as a reference. In the retransmission block table as shown in FIG. 15, in the case where the system bandwidth is 20 MHz (in the case of the base frequency block), the number of retransmission blocks is set at one when the number of transmission antennas is one, while being set at two when the number of transmission antennas is two or more. Then, for example, the number of retransmission blocks is two times in each transmission antenna when the system bandwidth is 40 MHz that is two times, while being five times in each transmission antenna when the system bandwidth is 100 MHz that is five times. In the former case, the number of retransmission blocks is two when the number of transmission antennas is one, while being four when the number of transmission antennas is two or more. In the latter case, the number of retransmission blocks is five when the number of transmission antennas is one, while being ten when the number of transmission antennas is two or more. In this case, as in the above-mentioned Embodiment, it is possible to prevent an event that retransmission of a retransmission block having the large retransmission block size is repeated due to the transmission error, and to achieve efficient retransmission control. Further, since the scheme of setting the number of retransmission blocks in the LTE specification is adopted in one to four transmission antennas in the system bandwidth of 20 MHz, it is possible to perform retransmission control without requiring the particular processing with the mobile terminal apparatus 10 having the system bandwidth and transmission antennas supporting the scheme.

In addition, with respect to the retransmission block size, the table differs from the retransmission block table as shown in FIG. 5 in the respects that in the case where the system bandwidth is 20 MHz (in the case of the base frequency block), the size is two times that in the case that the number of antennas is two when the number of transmission antennas is four, while being four times in the case that the number of antennas is two when the number of transmission antennas is eight. Further, also in the case that the system bandwidth is 40 MHz or more, the table differs from the retransmission block table as shown in FIG. 5 in the respect that the retransmission block sizes are common with the sizes in 20 MHz.

FIG. 16 shows a conceptual diagram of retransmission blocks transmitted from the base station apparatus 20 according to the retransmission block table as shown in FIG. 15. FIG. 16 shows the case where the number of transmission antennas is eight and the system bandwidth is 20 MHz (FIG. 16(a)), and the case where the number of transmission antennas is two and the system bandwidth is 100 MHz (FIG. 16(b)). As shown in FIG. 16(a), when the number of transmission antennas is eight and the system bandwidth is 20 MHz, the number of retransmission blocks is two, the retransmission block size is set at 300,000 bits, and transmission signals A to H each of 75,000 bits are transmitted from transmission antennas 1 to 8, respectively. Meanwhile, as shown in FIG. 16(b), when the number of transmission antennas is two and the system bandwidth is 100 MHz, the number of retransmissions blocks is ten, the retransmission block size is set at 75,000 bits, and transmission signals A to J each of 75,000 bits are transmitted from transmission antennas 1 and 2.

From the same viewpoint as that of the retransmission block table as shown in FIG. 15, as shown in FIG. 17, it is also possible to set the number of retransmission blocks corresponding to the system bandwidth, using the number of retransmission blocks in 20 MHz that is the base frequency block as a reference. The retransmission block table as shown in FIG. 17 differs from the retransmission block table as shown in FIG. 15 in the respect that in the case where the system bandwidth is 20 MHz (in the case of the base frequency block), the number of retransmission blocks is two times that in FIG. 15 when the number of transmission antennas is eight. The other respects are the same as those in the retransmission block table as shown in FIG. 15, and for example, the number of retransmission blocks is two times in each transmission antenna when the system bandwidth is 40 MHz that is two times, while being five times in each transmission antenna when the system bandwidth is 100 MHz that is five times. Also in this case, as in the above-mentioned Embodiment, it is possible to prevent an event that retransmission of a retransmission block having the large retransmission block size is repeated due to the transmission error, and to achieve efficient retransmission control. Further, since the scheme of setting the number of retransmission blocks in the LTE specification is adopted in one to four transmission antennas in the system bandwidth of 20 MHz, it is possible to perform retransmission control without requiring the particular processing with the mobile terminal apparatus 10 having the system bandwidth and transmission antennas supporting the scheme. Particularly, as shown in FIG. 17, since the maximum value of the retransmission block size is set at 150,000, it is possible to achieve commonality with the maximum retransmission block size in the LTE specification, and it is not necessary to newly define the retransmission block size, etc.

In addition, with respect to the retransmission block size, the table differs from the retransmission block table as shown in FIG. 15 in the respect that in the case where the system bandwidth is 20 MHz (in the case of the base frequency block), the size is the same as the retransmission block size (150,000 bits) in the case that the number of antennas is four when the number of transmission antennas is eight. The table is the same as the retransmission block table as shown in FIG. 15 in the respect that the retransmission block sizes are common with the sizes in 20 MHz when the system bandwidth is 40 MHz or more.

Figure 18:
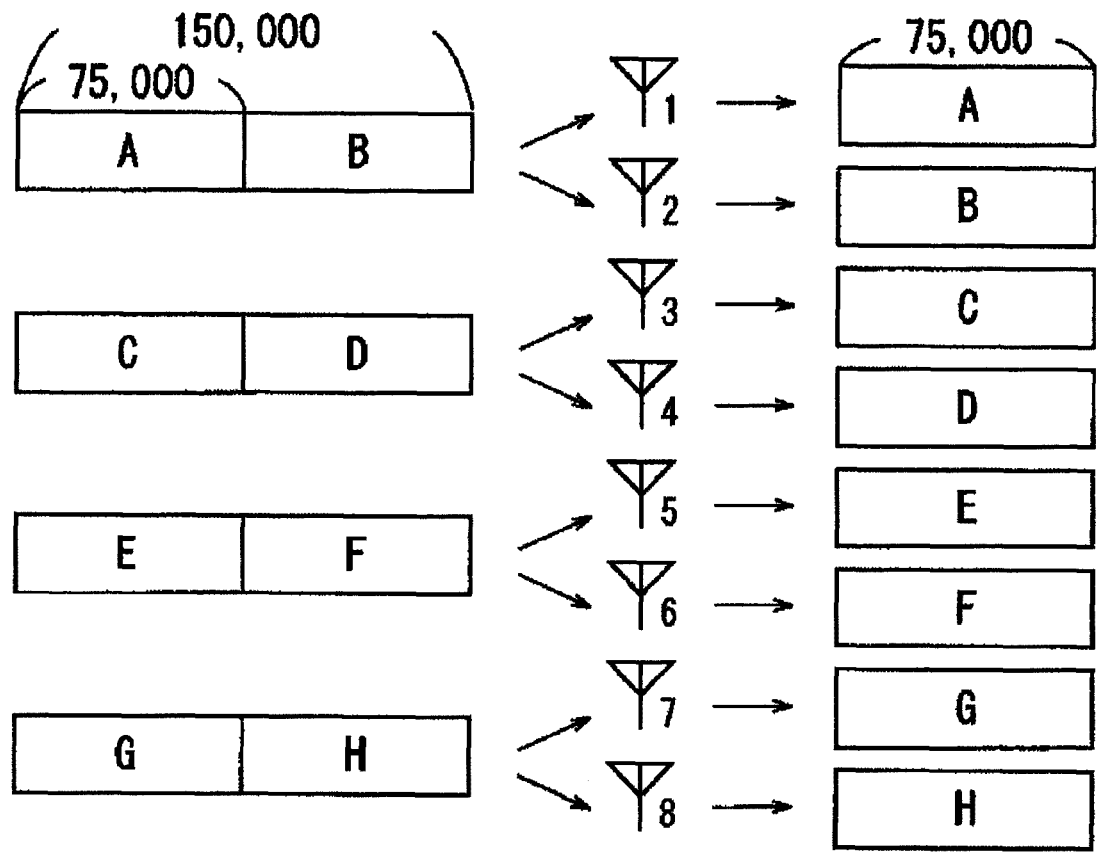
FIG. 18 is a conceptual diagram of retransmission blocks transmitted from the base station apparatus according to the retransmission block table as shown in FIG. 17.

FIG. 18 shows a conceptual diagram of retransmission blocks transmitted from the base station apparatus 20 according to the retransmission block table as shown in FIG. 17. FIG. 18 shows the case where the number of transmission antennas is eight and the system bandwidth is 20 MHz. As shown in FIG. 18, when the number of transmission antennas is eight and the system bandwidth is 20 MHz, the number of retransmission blocks is four, the retransmission block size is set at 150,000 bits, and transmission signals A to H each of 75,000 bits are transmitted from transmission antennas 1 to 8, respectively.

Further, in the retransmission block table, as shown in FIG. 19, it is also possible to set the number of retransmission blocks corresponding to the system bandwidth, irrespective of the number of transmission antennas, using the number of retransmission blocks in 20 MHz that is the base frequency block as a reference. In the retransmission block table as shown in FIG. 19, in the case where the system bandwidth is 20 MHz (in the case of the base frequency block), the number of retransmission blocks is set at one irrespective of the number of transmission antennas. Then, for example, the number of retransmission blocks is two times when the system bandwidth is 40 MHz that is two times, while being five times when the system bandwidth is 100 MHz that is five times. In the former case, the number of retransmission blocks is two irrespective of the number of transmission antennas. Meanwhile, in the latter case, the number of retransmission blocks is five irrespective of the number of transmission antennas. In this case, it is possible to achieve commonality of retransmission block sizes corresponding to the number of transmission antennas in each system bandwidth, and it is thus possible to simplify the processing in dividing the transmission signal into retransmission blocks.

In addition, with respect to the retransmission block size, the table differs from the retransmission block table as shown in FIG. 5 in the respects that in the case where the system bandwidth is 20 MHz (in the case of the base frequency block), the size is two times that in the case that the number of antennas is one when the number of transmission antennas is two, is four times that in the case that the number of antennas is one when the number of transmission antennas is four, and is eight times that in the case that the number of antennas is one when the number of transmission antennas is eight. Further, also in the case that the system bandwidth is 40 MHz or more, the table differs from the retransmission block table as shown in FIG. 5 in the respect that the retransmission block sizes are common with the sizes in 20 MHz.

FIG. 20 shows a conceptual diagram of retransmission blocks transmitted from the base station apparatus 20 according to the retransmission block table as shown in FIG. 19. FIG. 20 shows the case where the number of transmission antennas is eight and the system bandwidth is 20 MHz (FIG. 20(a)), and the case where the number of transmission antennas is eight and the system bandwidth is 40 MHz (FIG. 16(b)). As shown in FIG. 20(a), when the number of transmission antennas is eight and the system bandwidth is 20 MHz, the number of retransmission blocks is one, the retransmission block size is set at 600,000 bits, and transmission signals A to H each of 75,000 bits are transmitted from transmission antennas 1 to 8, respectively. Meanwhile, as shown in FIG. 20(b), when the number of transmission antennas is eight and the system bandwidth is 40 MHz, the number of retransmissions blocks is two, the retransmission block size is set at 600,000 bits, and transmission signals A to H each of 150,000 bits are transmitted from transmission antennas 1 to 8, respectively.

The present invention is not limited to the above-mentioned Embodiment, and is capable of being carried into practice with modifications thereof as appropriate. For example, the processing sections and processing procedures are capable of being carried into practice with various modifications thereof as appropriate without departing from the scope of the invention. Further, the invention is capable of being carried into practice with modifications thereof as appropriate without departing from the scope of the invention.

For example, the above-mentioned Embodiment describes the case where the mobile terminal apparatus 10 generates a retransmission request signal indicative of the ratio (ratio of erroneous coding blocks) in error detection of the reception signal to transmit to the base station apparatus 20, and the configuration of the retransmission request signal is not limited thereto, and is capable of being modified as appropriate. For example, a retransmission request signal including the content for identifying an erroneous coding block may be generated and transmitted to the base station apparatus 20. In this case, the base station apparatus 20 is capable of identifying the coding block in which the transmission error occurs and retransmitting only the coding block, and it is thus possible to actualize more efficient retransmission control.

The invention claimed is:

1. A base station apparatus comprising:
   a retransmission block dividing section configured to divide a transmission signal into retransmission blocks, each retransmission block being a retransmission unit, according to a retransmission block table in which the number of the retransmission blocks are registered and increased corresponding to the number of transmission antennas; and
   a retransmission section configured to retransmit transmission signals, in downlink, associated with the retransmission blocks divided by the retransmission block dividing section.

2. The base station apparatus according to claim 1, wherein the retransmission block dividing section divides a transmission signal into the retransmission blocks according to the retransmission block table in which the number of the retransmission blocks is set at the same as the number of transmission antennas.

3. The base station apparatus according to claim 2, further comprising:
   a coding rate adjusting section configured to adjust a coding rate of the transmission signal corresponding to a retransmission request signal indicative of a ratio in error detection of a reception signal transmitted from a mobile terminal apparatus.

4. The base station apparatus according to claim 3, further comprising:
   an interleave section configured to divide each of the retransmission blocks into a plurality of coding blocks and interleave each of the coding blocks to spread over the entire system bandwidth.

5. The base station apparatus according to claim 2, further comprising:
   an interleave section configured to divide each of the retransmission blocks into a plurality of coding blocks and interleave each of the coding blocks to spread over the entire system bandwidth.

6. The base station apparatus according to claim 1, wherein the retransmission block dividing section divides a transmission signal into the retransmission blocks according to the retransmission block table in which the number of the retransmission blocks is set at four when the number of transmission antennas is four or more.

7. The base station apparatus according to claim 6, further comprising:
   a coding rate adjusting section configured to adjust a coding rate of the transmission signal corresponding to a retransmission request signal indicative of a ratio in error detection of a reception signal transmitted from a mobile terminal apparatus.

8. The base station apparatus according to claim 7, further comprising:
   an interleave section configured to divide each of the retransmission blocks into a plurality of coding blocks and interleave each of the coding blocks to spread over the entire system bandwidth.

9. The base station apparatus according to claim 6, further comprising:
   an interleave section configured to divide each of the retransmission blocks into a plurality of coding blocks and interleave each of the coding blocks to spread over the entire system bandwidth.

10. The base station apparatus according to claim 1, further comprising:
a coding rate adjusting section configured to adjust a coding rate of the transmission signal corresponding to a retransmission request signal indicative of a ratio in error detection of a reception signal transmitted from a mobile terminal apparatus.

11. The base station apparatus according to claim 10, further comprising:
an interleave section configured to divide each of the retransmission blocks into a plurality of coding blocks and interleave each of the coding blocks to spread over the entire system bandwidth.

12. The base station apparatus according to claim 1, further comprising:
an interleave section configured to divide each of the retransmission blocks into a plurality of coding blocks and interleave each of the coding blocks to spread over the entire system bandwidth.

13. A mobile terminal apparatus comprising:
a reception section configured to receive transmission signals divided into retransmission blocks, each retransmission block being a retransmission unit, according to a retransmission block table in which the number of the retransmission blocks are registered and increased corresponding to the number of transmission antennas; and
a retransmission block combining section configured to combine the retransmission blocks to restore a transmission signal prior to division.

14. The mobile terminal apparatus according to claim 13, further comprising:
a retransmission request signal generating section configured to generate a retransmission request signal indicative of a ratio in error detection of a reception signal received in the reception section.

15. The mobile terminal apparatus according to claim 14, wherein the retransmission request signal generating section generates the retransmission request signal indicative of a ratio in error detection on a basis of each of coding blocks, each of the retransmission blocks being divided into the coding blocks.

16. A mobile communication system comprising:
a base station apparatus adapted to divide a transmission signal into retransmission blocks, each retransmission block being a retransmission unit, according to a retransmission block table in which the number of the retransmission blocks are registered and increased corresponding to the number of transmission antennas, and retransmits in downlink transmission signals associated with the divided retransmission blocks; and
a mobile terminal apparatus adapted to receive the transmission signals associated with the retransmission blocks, and combines the retransmission blocks to restore the transmission signal prior to division.

17. The mobile communication system according to claim 16, wherein the mobile terminal apparatus transmits a retransmission request signal indicative of a ratio in error detection of a reception signal, and the base station apparatus adjusts a coding rate of a transmission signal corresponding to the retransmission request signal.

18. An information retransmission method comprising the steps of:
in a base station apparatus, dividing a transmission signal into retransmission blocks, each retransmission block being a retransmission unit, according to a retransmission block table in which the number of the retransmission blocks are registered and increased corresponding to the number of transmission antennas; and
retransmitting in downlink transmission signals associated with the divided retransmission blocks; and
in a mobile terminal apparatus, receiving the transmission signals associated with the retransmission blocks; and
combining the retransmission blocks to restore the transmission signal prior to division.

19. The information retransmission method according to claim 18, further comprising:
transmitting from the mobile terminal apparatus a retransmission request signal indicative of a ratio in error detection of a reception signal; and
adjusting, in the base station apparatus, a coding rate of a transmission signal corresponding to the retransmission request signal.

* * * * *